United States Patent [19]

Shimizu et al.

[11] Patent Number: 5,457,170
[45] Date of Patent: Oct. 10, 1995

[54] PROCESS TO PREVENT POLYMER SCALE ADHESION USING CONDENSATION PRODUCT OF AN AROMATIC AMINE AND A QUINONE

[75] Inventors: Toshihide Shimizu, Urayasu; Mikio Watanabe, Kamisu, both of Japan

[73] Assignee: Shin-Etsu Chemical Co., Ltd., Tokyo, Japan

[21] Appl. No.: 366,056

[22] Filed: Dec. 29, 1994

Related U.S. Application Data

[62] Division of Ser. No. 964,267, Oct. 21, 1992, Pat. No. 5,424,003.

[30] Foreign Application Priority Data

| Oct. 21, 1991 | [JP] | Japan | 3-302294 |
| Dec. 27, 1991 | [JP] | Japan | 3-359427 |
| Dec. 27, 1991 | [JP] | Japan | 3-359429 |
| Dec. 27, 1991 | [JP] | Japan | 3-359430 |
| Feb. 24, 1992 | [JP] | Japan | 4-072910 |
| Feb. 24, 1992 | [JP] | Japan | 4-072911 |
| Jun. 11, 1992 | [JP] | Japan | 4-177467 |

[51] Int. Cl.$^6$ .......................... C08F 2/34
[52] U.S. Cl. .......................... 526/62; 526/74
[58] Field of Search .......................... 526/62, 74

[56] References Cited

U.S. PATENT DOCUMENTS 5,378,773  1/1995  Shimizu et al. .......................... 526/217

Primary Examiner—Joseph L. Schofer
Assistant Examiner—Tom Weber
Attorney, Agent, or Firm—Oblon, Spivak, McClelland, Maier & Neustadt

[57] ABSTRACT

A polymer scale preventive process for use in polymerization of a monomer having an ethylenically unsaturated double bond, comprising an alkaline solution containing a condensation product of (A) an aromatic amine compound and (B) a quinone compound. This process is used for forming a coating on the inner wall, etc. of a polymerization vessel. Such a vessel is effective in preventing polymer scale deposition and useful in producing a polymer that shows very few fish eyes and good whiteness when formed into sheets or the like.

14 Claims, No Drawings

PROCESS TO PREVENT POLYMER SCALE ADHESION USING CONDENSATION PRODUCT OF AN AROMATIC AMINE AND A QUINONE

This is a Division of application Ser. No. 07/964,267 filed on Oct. 21, 1992, now U.S. Pat. No. 5,424,003.

BACKGROUND OF THE INVENTION

1. Field of the Invention

The present invention relates to a polymer scale preventive agent useful in polymerization of a monomer having an ethylenically unsaturated double bond, a polymerization vessel effective in preventing polymer scale deposition, and a process of producing a polymer using said vessel.

2. Description of the Prior Art

As a method of polymerizing a monomer having an ethylenically unsaturated double bond, are known suspension polymerization, emulsion polymerization, solution polymerization, gas phase polymerization and bulk polymerization. In any type of the polymerizations, polymer scale is liable to be deposited on the areas with which the monomer come into contact during polymerization, such as inner walls, stirring equipment and so on of a polymerization vessel.

The deposition of the polymer scale on the inner wall results in disadvantages that the yield of the polymer and cooling capacity of the polymerization vessel are lowered; that the polymer scale may peel and mix into a polymeric product, thereby impairing the quality of thereof; and that removal of such polymer scale is laborious and hence time-consuming. Further, since the polymer scale contains unreacted monomers and operators may be exposed thereto, which may cause physical disorders in the operators.

Heretofore, as a method for preventing polymer scale deposition on the inner wall and so forth, methods by which a polymer scale preventive agent comprising an amine compound, quinone compound, aldehyde compound or the like is coated on the inner wall, etc. of a polymerization vessel or methods by which such compounds are added to an aqueous medium for polymerization (Japanese Patent Publication (KOKOKU) No. 45-30343 (1960)).

These methods can prevent the deposition of polymer scale if polymerization run is repeated within about 5 or 6 times; however, the number of repetition of polymerization run exceeds 5 or 6, the scale preventive effect is weakened. That is, the scale preventive effect is poor in durability. Particularly, the scale preventive effect is adversely affected where a water-soluble catalyst is used and unsatisfactory industrially.

It is proposed in Japanese Pre-examination Patent Publication (KOKAI) No. 53-13689(1978) to form a coating of a condensation product of an aromatic amine compound on the areas with which monomers comes into contact, such as the inner wall of a polymerization vessel. The formation of the coating of such a condensation product enables repetition of about 100 to 200 polymerization runs without deposition of polymer scale on the areas in the liquid phase, i.e., under the liquid surface inside the polymerization vessel.

However, polymer scale deposition is liable to occur in the vicinity of the interface between the gas phase and the liquid phase which is located at the upper section of a polymerization vessel. Once polymer scale is deposited in the vicinity of the interface between the gas phase and the liquid phase, the deposited scale will grow gradually as polymerization runs are repeated, and at last it is peeled from the inner wall, etc. and incorporated into the polymeric product. If the polymeric product containing the polymer scale is processed into formed products such as sheets or the like, the polymer scale causes increase in fish eyes in the formed products, lowering seriously the quality thereof.

Polymeric products obtained by polymerization are required to have a high whiteness. That is, when a polymeric product is formed into a sheet or the like without any addition of a coloring agent, the resulting formed product is more or less colored. Such coloration is called initial coloration, which is desired to be as low as possible. However, the coating comprising said condensation product of an aromatic amine compound disclosed in the Japanese Pre-examination Publication may be peeled or dissolved into a polymeric product, thereby lowering the whiteness or increasing the initial coloration thereof.

SUMMARY OF THE INVENTION

It is accordingly an object of the present invention to provide a polymer scale preventive agent for use in polymerization of a monomer having an ethylenically unsaturated double bond that can prevent effectively the deposition of polymer scale not only in the areas in the liquid phase but also in the vicinity of the interface between the gas and liquid phases, and can produce polymeric products with a very small number of fish eyes and low initial coloration after processed into formed products such as sheets or the like, a polymerization vessel using the same, and a process of producing a polymer using the vessel.

Thus, the present invention provides, as a means of achieving the above object, a polymer scale preventive agent for use in polymerization of a monomer having an ethylenically unsaturated double bond, comprising an alkaline solution containing a condensation product of (A) an aromatic amine compound and (B) a quinone compound.

The present invention also provides a polymerization vessel for use in polymerization of a monomer having an ethylenically unsaturated double bond, having on its inner wall surfaces a polymer scale preventive coating, wherein said coating has been formed by applying an alkaline solution containing a condensation product of (A) an aromatic amine compound and (B) a quinone compound, followed by drying.

Further, the present invention provides a process of producing a polymer of an ethylenically unsaturated double bond, which comprises polymerizing the monomer in a polymerization vessel having a polymer scale preventive coating on its inner wall surfaces, wherein said coating has been formed by applying an alkaline solution containing a condensation product of (A) an aromatic amine compound and (B) a quinone compound, followed by drying.

According to the present invention, deposition of polymer scale can be effectively prevented not only on the areas in the liquid phase but also in the vicinity of the interface between the gas and liquid phases in a polymerization vessel. Therefore, the present invention makes it unnecessary to conduct the operation of removing the polymer scale after every polymerization run, and the productivity is thereby improved.

Further, when the polymeric product obtained by the application of the present invention is processed into formed products such as sheets, the resulting formed products have very few fish eyes.

Furthermore, the formed products obtained as above is low in initial coloration. That is, the formed products exhibit a luminosity index L in the Hunter's color difference equation described in JIS Z 8730(1980) of 70 or more in the case of vinyl chloride polymers and 80 or more in the case of SBR.

DETAILED DESCRIPTION OF PREFERRED EMBODIMENTS

(A) Aromatic Amine Compound

The aromatic amine compounds (A) are classified into (A-1) aromatic amine compounds having at least one group selected from the group consisting of hydroxyl group, carboxyl group and sulfo group ($-SO_3H$) and (A-2) aromatic amine compounds free of hydroxyl group, carboxyl group and sulfo group.

(A-1) Aromatic amine compounds having at least one group selected from the group consisting of hydroxyl group, carboxyl group and sulfo group ($-SO_3H$)

The aromatic amine compounds (A-1) include, for example, the compounds represented by the general formulas (1) to (3).

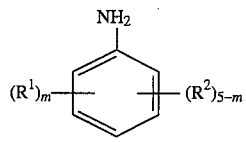
(1)

wherein m is an integer of 1 to 5, $R^1$ stands for at least one group selected from the group consisting of $-OH$, $-COOH$ and $-SO_3H$ and, where there exist two or more $R^1$'s, the $R^1$'s may be the same or different, and $R^2$ stands for at least one group selected from the group consisting of $-H$, $-NH_2$, $-Cl$, $-NO_2$, $-COCH_3$, $-OCH_3$, $-N(CH_3)_2$ and alkyl groups having 1 to 3 carbon atoms and, where there exist two or more $R^2$'s, the $R^2$'s may be the same or different.

Specifically, the compounds of the general formula (1) include, for example, o-, m- or p-aminophenol, 2-amino-4-chlorophenol, 5-nitro-2-aminophenol, 2-nitro-4-aminophenol, 4-nitro-2-aminophenol, o-, m- or p-aminobenzoic acid, 2,3-, 2,4-, 2,5-, 2,6-, 3,4-, 3,5- or 4,6-diaminobenzoic acid, 3- or 4-aminophthalic acid, 2-,4- or 5-aminoisophthalic acid, 4,6-diaminoisophthalic acid, 2,5- or 2,6-diaminotelephthalic acid, 3-,4- or 5-aminosalicylic acid, 4-hydroxyanthranilic acid, o-, m- or p-aminobenzenesulfonic acid, 2,3-, 2,4-, 2,5-, 2,6-, 3,4- or 3,5-diaminobenzenesulfonic acid, 2-amino-1-phenol-4-sulfonic acid, 6-amino-4-nitro-1-phenol-2-sulfonic acid and 6-amino-4-chloro-1-phenol-2-sulfonic acid.

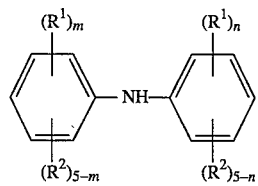
(2)

wherein m is as defined above, $R^1$ is as defined above and, where two or more $R^1$'s are present, they may be the same or different, $R^2$ is as defined above and, where two or more $R^2$'s are present, they may be the same or different, and n is an integer of 0 to 5.

Specifically, the compounds of the general formula (2) include, for example, 4-hydroxydiphenylamine, 4-amino-4'-hydroxydiphenylamine, 4-carboxydiphenylamine, 4-amino- 4'-carboxydiphenylamine, 4-sulfodiphenylamine and 4-amino- 4'-sulfodiphenylamine.

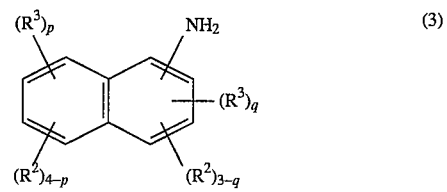
(3)

wherein p is an integer of 0 to 4, q is an integer of 0 to 3, provided that p and q are not 0 at the same time, $R^2$ is as defined above and, where two or more $R^2$'s are present, they may be the same or different, and $R^3$ is at least one group selected from the group consisting of $-OH$, $-COOH$, $-CH_2COOH$, $-CH_2CH_2COOH$ and $-SO_3H$ and, where two or more $R^3$'s are present, they may be the same or different.

Specifically, the compounds of the general formula (3) include, for example, 4-amino-1-naphthol, 1-amino-5-naphthol, 1,2-naphtyldiamine-7-carboxylic acid, 1,5-naphthalenediamine-2-carboxylic acid, 1,5-naphthalenediamine-4-carboxylic acid, 1,6-naphthalenediamine-4-carboxylic acid, 1,8-naphthalenediamine-4-carboxylic acid, 1,2-naphthalenediamine-3-sulfonic acid, 1,2-naphthalenediamine-4-sulfonic acid, 1,2-naphthalenediamine-5-sulfonic acid, 1,2-naphthalenediamine-6-sulfonic acid, 1,2-naphthalenediamine-7-sulfonic acid, 1,3-naphthalenediamine-5-sulfonic acid, 1,3-naphthalenediamine-6-sulfonic acid, 1,4-naphthalenediamine-2-sulfonic acid, 1,4-naphthalenediamine-7-sulfonic acid, 1,5-naphthalenediamine-2-sulfonic acid, 1,5-naphthalenediamine-4-sulfonic acid, 1,5-naphthalenediamine-7-sulfonic acid, 1,6-naphthalenediamine-2-sulfonic acid, 1,6-naphthalenediamine-4-sulfonic acid, 1,6-naphthalenediamine-7-sulfonic acid, 1,8-naphthalenediamine-4-sulfonic acid, 1,8-naphthalenediamine-3,6-disulfonic acid, 1,8-naphthalenediamine-4,5-disulfonic acid, α-amino-β-naphthalenepropionic acid, α-amino-β-naphthalenecarboxylic acid, 2-naphthylamine-1-sulfonic acid, 8-naphthylamine-1-sulfonic acid, 5-naphthylamine-1-sulfonic acid, 1-amino-2-naphthol-4-sulfonic acid, 2-amino-8-naphthol-6-sulfonic acid (gamma acid), 2-amino-5-naphthol-7-sulfonic acid (J acid), 1-amino-8-naphthol-3,6-disulfonic acid (H acid) and the like.

Among the compounds (A-1), preferred are o-, m- or p-aminophenol, 2,4- or 2,5-diaminobbenzenesufonic acid, 2,3-, 2,4-, 2,5-, 3,4- or 3,5-diaminobenzoic acid, 4,6-diaminoisophthalic acid, 2,5- or 2,6-diaminotelephthalic acid, 2,5- or 2,6-diaminotelephthalic acid, 1,2-naphthalenediamine-7-sulfonic acid, 1,5- or 1,6-naphthalenediamine-4-sulfonic acid, 1,5- or 1,6-naphthalenediamine-4-carboxylic acid.

(A-2) Aromatic amine compounds free of hydroxyl group, carboxyl group and sulfo group The compounds (A-2) include, for example, the compounds represented by the general formulas (4) to (6).

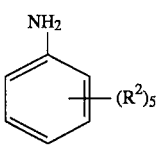

wherein $R^2$ may be the same or different and are each as defined above.

Specifically, the compounds of the general formula (4) include, for example, aniline, o-, m- or p-phenylenediamine, o-, m- or p-chloroaniline, o-, m- or p-nitroaniline, o-, m- or p-methylaniline, N,N-dimethyl-p-phenylenediamine, 4-chloro-o-phenylenediamine, 4-methoxy-o-phenylenediamine, 2,3-diaminotoluene and the like.

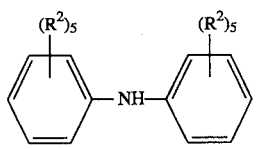

wherein $R^2$ may be the same or different and are each as defined above.

Specifically, the compounds of the general formula (5) include, for example, 4-aminodiphenylamine, 2-aminodiphenylamine, 4,4'-diaminodiphenylamine and 4-amino-3'-methoxydiphenylamine.

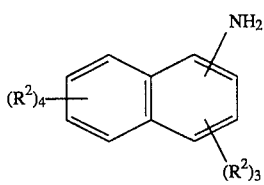

wherein $R^2$ may be the same or different and are each as defined above.

Specifically, the compounds of the general formula (6) include, for example, α-naphthylamine, β-naphthylamine, 1,5-diaminonaphthalene, 1,8-diaminonaphthalene, 2,3-diaminonaphthalene and the like.

Among the compounds (A-2), preferred are o-, m- or p-phenylenediamine, 2- or 4-aminodiphenylamine, 4,4'-diaminodiphenylamine, and 1,5- or 1,8-diaminonaphthalene.

The aromatic amine compounds (A) may be used singly or in combination of two or more.

As the aromatic amine compound (A), at least one compound selected from the group consisting of the compounds (A-1) and the compounds (A-2) needs to be used. Preferably, at least one compound (A-1) is used, and more preferably a compound (A-1) and a compound (A-2) are used in combination.

(B) Quinone Compound

The quinone compounds include, for example, the compounds represented by the general formulas (7), (8), (9) and (10):

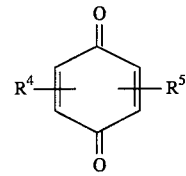

wherein $R^4$ stands for —H, —NH$_2$, —Cl, —Br, —OH, —NO$_2$, —COCH$_3$, —OCH$_3$, —N(CH$_3$)$_2$ or an alkyl group having 1 to 3 carbon atoms, and $R^5$ stands for —H, —NH$_2$, —OH, —CH$_3$, —COOH or —SO$_3$H.

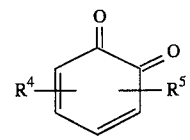

wherein $R^4$ and $R^5$ are as defined above.

Specifically, examples of the compounds of the general formula (7) or (8) include o-, m- or p-benzoquinone, hydroxy-p-benzoquinone, chloro-p-benzoquinone, bromo-p-benzoquinone, duroquinone, chloranil.

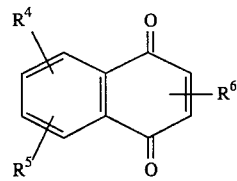

wherein $R^4$ and $R^5$ are as defined above, and $R^6$ stands for —H, —OH, —CH$_3$, —Cl, —Br, —COCH$_3$, —OCH$_3$, —COOH or —SO$_3$H; and

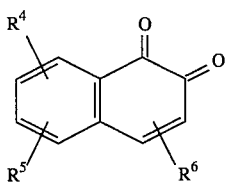

wherein $R^4$, $R^5$ and $R^6$ are as defined above.

Specifically, examples of the compounds of the general formula (9) or (10) include 6-methyl-1,4-naphthoquinone, 2-methyl-1,4-naphthoquinone, lawsone, juglone, plumbagin, α-naphthoquinone, and β-naphthoquinone.

Among the quinone compounds above, preferred are o- or p-benzoquinone, α-naphthoquinone, β-naphthoquinone and lawsone.

The quinone compounds may be used singly or in combination or two or more.

Condensation Reaction

The condensation product of the aromatic amine compound (A) and the quinone (B), which is the effective component of the present polymer scale preventive agent, can be prepared by reacting the components (A) and (B) optionally in the presence of a catalyst at a temperature of room temperature to about 200° C. in a suitable medium for about 0.5 to 100 hours, preferably at a temperature of from room temperature to 150° C. for 3 to 30 hours.

In the condensation reaction above, the quinone compound acts as a catalyst; therefore, normally it is not necessary to add another condensation catalyst. Nevertheless, a condensation-catalyst may be added to the reaction system on the case-by-case basis. Condensation catalysts include, for example, azo compounds such as α,α'-azobisisobutyronitrile and α,α'-azobis-2,4-dimethylvaleronitrile, elemental or molecular halogens such as iodine, bromine and fluorine, inorganic peroxides such as hydrogen peroxide, sodium peroxide, potassium persulfate, and ammonium persulfate, organic peroxides such as peracetic acid, benzoyl peroxide, cumene hydroperoxide, perbenzoic acid and p-menthane hydroperoxide, oxyacids or salts thereof such as iodic acid, periodic acid, potassium periodate and sodium perchlorate, metallic salts such as ferrous oxide, ferric oxide, copper sulfate, copper (I) oxide, and ferric chloride, and aromatic nitro compounds such as nitrobenzene, o-, m- or p-hydroxynitrobenzene, o-, m- or p-nitroanisole, o-, m- or p-chlorobenzene, o-, m- or p-nitrobenzenesulfonic acid, etc.

The solvents for the condensation reaction include organic solvents such as, e.g., alcohols, ketones and esters, among which organic solvents compatible with water are preferred. The organic solvents compatible with water include, for example, alcohols such as methanol, ethanol and propanol, ketones such as acetone, methyl ethyl ketone, and the like, and esters such as methyl acetate and ethyl acetate, out of which alcohols are particularly preferred. Mixed solvents of water and an organic solvent compatible with water can be also used.

The reaction medium for the condensation reaction normally has a pH of 1 to 13. A pH adjuster is not particularly limited.

Although the amounts of the aromatic amine compound (A) and the quinone compound (B) subjected to the condensation reaction depends on the kinds of the aromatic amine compound (A), the quinone compound (B) and solvent, reaction temperature, reaction time, etc., normally the quinone compound (B) is used in an amount of about 0.01 to about 10 parts by weight, preferably 0.1 to 5 parts by weight, per part by weight of the aromatic amine compound (A). If the amount of the component (B) is too small or too large relative to that of the component (A), the resulting condensation product is poor in polymer scale preventing effect.

In a preferred embodiment of the present invention, a compound (A-1) is used as the component (A), and more preferably a compound (A-1) and a compound (A-2) are used in combination as the component (A). In the preferred embodiment, more improved polymer scale preventing effects are obtained. Presumably, this is because the combined use of the compound (A-1) and the compound (A-2) increases the adhesion of the condensation product to the inner wall surfaces, etc. of a polymerization vessel when an alkaline solution containing the condensation product is applied thereto as described later. Where the two aromatic amine compounds (A-1) and (A-2) are used in combination, the compound (A-2) is preferably used in an amount of 0.01 to 10 parts by weight, more preferably 0.1 to 5 parts by weight, per part by weight of the compound (A-1).

(C) Reaction Stopper

If the condensation product of the components (A) and (B) has too high a degree of condensation, when it is dissolved in a solvent to prepare a polymer scale preventive agent described later, it may form sediment and the polymer scale preventive agent obtained is not uniform, thereby lowering the scale preventing effect. Therefore, it is preferable to add (C) a reaction stopper to the reaction mixture at an suitable time during the condensation reaction of the components (A) and (B), so that further progress of the condensation is inhibited and the degree of condensation is controlled. Further, the addition of the reaction stopper (C) makes it possible to store the condensation product of the components (A) and (B) for a long time.

As the reaction stopper (C), for instance, inorganic reducing agents (C-1), aromatic hydroxyl compounds (C-2) and aromatic hydroxyl compound-based condensation products (C-3) can be used, as described below.

(C-1) Inorganic reducing agent

The inorganic reducing agent includes, for example, hydrogen, hydrogen iodide, hydrogen bromide, hydrogen sulfide, hydrides such as lithium aluminum hydride, sodium borohydride, calcium borohydride, zinc borohydride, tetraalkylammonium borohydride, trichlorosilane, triethylsilane, and the like, lower oxides or lower oxyacids such as carbon monoxide, sulfur dioxide, sodium thiosulfate, sodium thiosulfite, sodium sulfite, potassium sulfite, sodium bisulfite, and sodium hydrosulfite, sulfur compounds such as Rongalit, sodium sulfide, sodium polysulfide, and ammonium sulfide, alkali metals such as sodium and lithium, metals that are electrically highly positive such as magnesium, calcium, aluminum and zinc and their amalgams, salts of metals in a lower valence state such as iron(II) sulfate, tin(II) chloride, titanium(III) trichloride, and the like, phosphorus compounds such as phosphorus trichloride, phosphorus triiodide, trimethylphosphine, triphenylphosphine, trimethylphosphite, and hexamethylphosphorus triamide, hydrazine, diborane, and substituted diboranes such as ethane-1,2-diaminoborane, dimethylamine-borane, and pyridine-borane. Among these compounds, preferred are hydrogen iodide, hydrogen bromide, sodium borohydride, sulfur dioxide, sodium thiosulfate, sodium thiosulfite, sodium sulfite, potassium sulfite, sodium bisulfite and Rongalit.

(C-2) Aromatic hydroxyl compound

The aromatic hydroxyl compound (C-2) includes, for example, the compounds having the general formulas (11) and (12):

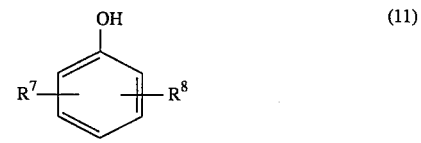

(11)

wherein $R^7$ stands for —H, —Cl, —OH, —COCH$_3$, —OCH$_3$, —COOH, —SO$_3$H or an alkyl group having 1 to 3 carbon atoms, and $R^7$ stands for —H, —Cl, —OH, —OCH$_3$, —OC$_2$H$_5$ or —COOH.

Specifically, the compounds of the general formula (4) include, for example, phenols such as phenol, hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid, 2,5-, 2,6- or 3,5-dihydroxytoluene and the like. Among the compounds, preferred are hydroquinone, resorcinol, catechol, hydroxyhydroquinone, o-, m- or p-hydroxybenzoic acid and pyrogallol.

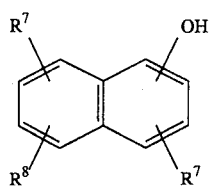

(12)

wherein the two $R^7$ may be the same or different and are each as defined above, and $R^8$ is as defined above.

Specifically, the compounds of the general formula (12) include, for example, naphthols and their derivatives such as α-naphthol, β-naphthol, 1,3-, 1,4-, 1,5-, 2,3-, 2,6- or 2,7-dihydroxynaphthalene, 1-hydroxy-2-naphthoic acid, 3-hydroxy-2-naphthoic acid and the like. Among these, preferred are α-naphthol, β-naphthol, and 1,3- or 2,7-dihydroxynaphthalene.

The aromatic hydroxyl compounds may be used singly or in combination of two or more.

(C-3) Aromatic hydroxyl compound-based condensate

The aromatic hydroxyl compound-based condensate is a condensation product essentially comprising an aromatic hydroxyl compound described as the compound (C-2) above as a condensation reactant, and includes, for example, condensation products of an aromatic hydroxyl compound only, condensation products of an aromatic hydroxyl compound with other compounds such as, for example, acetone, aldehydes and aromatic amine compounds, natural aromatic hydroxyl-containing organic compounds, and natural flavonoid hydroxyl-containing organic compounds.

(C-3-1) Condensates of aromatic hydroxyl compound only

Any of the aromatic hydroxyl compounds exemplified above as compound (C-2) can form condensates through condensation reaction. Typical examples include the condensates of pyrogallol, resorcinol, catechol, 2,7-dihydroxynaphthalene, or 2-hydroxynaphthoquinone.

The condensate can be obtained by reacting an aromatic hydroxyl compound in the presence of a catalyst such as a peroxide, azo compound, nitro compound, halogen compound, quinone or metallic salt at a temperature of about room temperature to 100° C. in water, an organic solvent such as alcohols, ketones, and esters, or a mixed solvent of water and an organic solvent mentioned above. Specifically, the catalyst used includes, for example, peroxides such as periodic acid, potassium periodate and hydrogen peroxide, azo compounds such as α,α'-azobisisobutyronitrile, metallic salts such as ferric chloride, aromatic nitro compounds such as nitrobenzene, and aromatic quinone compounds such as p-benzoquinone.

(C-3-2) Aromatic hydroxyl compound-acetone condensate

All of the condensation products of acetone with any of the aromatic hydroxyl compounds described as (C-2) above, can be used. Typical examples of the condensates include pyrogallol-acetone condensates, resorcinol-acetone condensates, 2,7-dihydroxynaphthalene-acetone condensates, 1,5-dihydroxynaphthalene-acetone condensates, 2,6-dihydroxynaphthalene-acetone condensates, 2,3-dihydroxynaphthalene-acetone condensates, 2-hydroxynaphthoquinone-acetone condensates, alizarin-acetone condensates and the like.

The condensates above can be obtained by dissolving an aromatic hydroxyl compound in acetone, and reacting them in the presence of a catalyst at a temperature of about room temperature to 100° C. As the catalyst, phosphorus oxychloride is used, for instance.

(C-3-3) Aromatic hydroxyl compound-aldehyde condensate

The aldehyde used as one of the reactants includes, for example, formaldehyde, acetaldehyde, glyoxal, glutaric aldehyde, benzaldehyde and the like.

All of the condensates of any of the aromatic hydroxyl compound with any of the aldehydes above can be used. Typical examples of the condensates include the condensates of formaldehyde with phenol, hydroquinone, catechol, pyrogallol, 2,7-dihydroxynaphthalene, 1,5-dihydroxynaphthalene, 2,3-dihydroxynaphthalene, alizarin, anthraflavic acid, or 1,4,5,8-tetrahydroxynaphthalene, pyrogallol-benzaldehyde condensates, phenol-benzaldehyde condensates, 2,3-dihydroxynaphthalene-benzaldehyde condensates, catechol-benzaldehyde condensates, anthraflavic acid-benzaldehyde condensates, 2,7-dihydroxynaphthalene-benzaldehyde condensates, 1,4,5,8-tetrahydroxynaphthalene-benzaldehyde condensates, 1,5-dihydroxynaphthalene-benzaldehyde condensates and the like.

The condensate can be obtained by reacting an aromatic hydroxyl compound and an aldehyde in the presence of a catalyst in an aqueous or alcoholic solvent around room temperature to about 200° C. The catalyst includes, for example, acidic substances such as phosphoric acid and hydrochloric acid, and alkaline substances such as sodium hydroxide, potassium hydroxide and ammonia.

(C-3-4) Aromatic hydroxyl compound-aromatic amine compound condensates

The aromatic amine compound which is used as one of the reactants for the condensate, is exemplified by those described as the component (A) above.

The combination of an aromatic hydroxyl compound and an aromatic amine compound is not particularly limited. Typical examples include pyrogallol-p-phenylenediamine condensates, resorcinol-m-phenylenediamine condensates, pyrogallol-1,8-diaminonaphthalene condensates, catechol-1,8-diaminonaphthalene condensates, 2,7-dihydroxynaphthalene-p-aminophenol condensates, 4-aminodiphenylamine-pyrogallol condensates, and 2,3-dihydroxynaphthalene-1,5-diaminonaphthalene condensates.

The condensate can be obtained by reacting an aromatic hydroxyl compound and an aromatic amine compound at a temperature of about room temperature to about 200° C. in the presence of a catalyst in water, an organic solvent such as alcohols, ketones and esters, or a mixed solvent of water and an organic solvent mentioned above. The catalyst used includes, for example, peroxides such as periodic acid, potassium periodate and hydrogen peroxide, azo compounds such as α,α'-azobisisobutyronitrile, metallic salts such as ferric chloride, aromatic nitro compounds such as nitrobenzene, and aromatic quinone compounds such as p-benzoquinone.

(C-3-5) Natural aromatic hydroxyl-containing organic compound

The natural aromatic hydroxyl-containing organic compounds include, for example, Chinese gallotannin, sumac tannin, tara tannin, valonia tannin, chestnut tannin, myrobalan tannin, oak tannin, divi-divi tannin, algarobilla-tannin, gambier tannin, quebrachotannin, wattle tannin, mimosa tannin, mangrove tannin, hemlock tannin, spruce tannin, Burma cutch tannin, oak bark tannin, tannin of persimmon, curcumin, urushiol, lignin, sodium lignin sulfonate, alkali lignin and the like.

(C-3-6) Natural flavonoid hydroxyl-containing organic compounds

The natural flavonoid hydroxyl-containing organic compounds include, for example, pigments of *Perilla frutescens*, pigments of grape juice, pigment of grape skin, pigments of red cabbage, pigments of corn, pigments of koaliang, pigments of safflower, and pigment of cacao.

Among the aromatic hydroxyl compound-based condensates above, preferred are pyrogallol-acetone condensates, 2,7-dihydroxynaphthalene-acetone condensates, 2,3-dihydroxynaphthalene-acetone condensates, resorcinol-acetone condensates, 2,7-dihydroxynaphthalene-benzaldehyde condensates, 2,3-dihydroxynaphthalene-formaldehyde condensates, 1,4,5,8-tetrahydroxynaphthalene-benzaldehyde condensates, pyrogallol-formaldehyde condensates, 2,7-dihydroxynaphthalene condensates, pyrogallol condensates, 2,7-dihydroxynaphthalene-p-aminophenol condensates, catechol-4-aminodiphenylamine condensates, pyrogallol-1,8-diaminonaphthalene condensates, nutgalls tannin, wattle tannin, mimosa tannin, oak tannin, Chinese gallotannin, quebrachotannin, chestnut tannin, tannin of persimmon, and mangrove tannin.

The reaction stoppers (C) above can be used singly or in combination of two or more.

The reaction stopper (C) may be added to the reaction mixture after the condensation reaction of the components (A) and (B) is initiated, and preferably the reaction stopper (C) is added to the reaction mixture just before a condensation product of the components (A) and (B) precipitates, that is, at the time when the condensation conversion of the components (A) and (B) has reached a value in the range of 50 to 99% by weight, particularly 70 to 95% by weight. When a reaction stopper is added to the reaction mixture, the condensation reaction is almost stopped. Nevertheless, after the addition of the reaction stopper (C), the reaction system is normally maintained at the reaction temperature under stirring for 0 to 50 hours.

Condensation conversion of the components (A) and (B) herein means the total amount in % by weight of the components (A) and (B) consumed for the condensation based on the total amount of the components (A) and (B) charged as monomers. That is, condensation conversion of the components (A) and (B) is defined by the equation:

$$\text{Condensation conversion (\% by weight)} = [(a-b)/a] \times 100$$

wherein a stands for the total amount in part(s) by weight of the components (A) and (B) charged as monomers, and b stands for the total amount in part(s) by weight of the unreacted components (A) and (B).

It normally takes 0.1 to 80 hours for the condensation conversion of the components (A) and (B) to reach 50 to 99% by weight, although the time depends on the kinds of the components (A) and (B), etc.

Where the reaction stopper (C) is added to the reaction mixture, the preferred amount of the reaction stopper (C) is in the range of 0.01 to 10 parts by weight, more preferably 0.1 to 5 parts by weight per part by weight of the components (A) and (B) in total.

Polymer scale preventive agent comprising an alkaline solution containing the condensation product of components (A) and (B)

The polymer scale preventive agent of the present invention comprises an alkaline solution of the condensation product of the components (A) and (B), which is used for forming a coating on, for example, the inner wall surfaces of a polymerization vessel, and the deposition of polymer scale is thereby prevented.

For example, the polymer scale preventive agent may be prepared by, optionally, adding a solvent described below as required to a solution containing the condensation product of the components (A) and (B) resulting from the condensation reaction, and adjusting pH value. Alternatively, it may be prepared by adding the solution containing the condensation product into a cold water to allow the condensation product to form sediment, filtering off and drying the sediment, adding a solvent described below to the dried sediment, and adjusting pH value.

Since the polymer scale preventive agent of the present invention is made alkaline as described above, the solubility of the condensation product of the components (A) and (B) in a solvent is increased and the solution is made uniform, so that its polymer scale preventing effect is enhanced when coated on the inner wall, etc. of a polymerization vessel. The pH of the polymer scale preventive agent of the present invention is preferably in the range of 7.5 to 13.5, more preferably 8.0 to 12.5. As an alkaline compound to be used for adjusting pH, for example, alkali metal compounds such as LiOH, NaOH, KOH, $Na_2CO_3$, $Na_2HPO_4$, $NH_4OH$ and the like, ammonium compounds, and organic amine compounds such as ethylenediamine, monoethanolamine, triethanolamine and the like, can be used.

Solvents to be used for preparation of the polymer scale preventive agent include, for example, water; alcohols such as methanol, ethanol, propanol, butanol, 2-butanol, 2-methyl-1-propanol, 2-methyl-2-propanol, 3-methyl-1-butanol, 2-methyl-2-butanol, 2-pentanol, etc.; ketones such as acetone, methyl ethyl ketone, methyl isobutyl ketone, etc.; esters such as methyl formate, ethyl formate, methyl acetate, ethyl acetate, methyl acetoacetate, etc.; ethers such as 4-methyldioxolane, ethylene glycol diethyl ether, etc.; furans such as tetrahydrofuran, furfural, furfuryl alcohol, and tetrahydrofurfuryl alcohol; and aprotic solvents such as acetonitrile, dimethylformamide and dimethyl sulfoxide. These solvents may be used singly or as a mixed solvent of two or more thereof in a case-by-case basis.

Among the solvents above, particularly preferred are water, and mixed solvents of water and an organic solvent compatible with water. The organic solvent compatible with water includes, for example, alcohols such as methanol, ethanol and propanol, ketones such as acetone and methyl ethyl ketone, and esters such as methyl acetate and ethyl acetate. The mixed solvents of water and an organic solvent compatible with water preferably contains the organic solvent in such an amount that there is no fear about ignition or explosion and safety in handling is ensured as to virulence, etc. Specifically, the amount of the organic solvent is preferably 50% by weight or less, and more preferably 30% by weight or less.

The concentration of the condensation product of the components (A) and (B) in the alkaline solution is not limited as long as a total coating weight described later can be obtained. Normally, the concentration is in the range of about 0.001 to about 5% by weight, preferably 0.01 to 1% by weight.

In order to further enhance the scale preventive effect, to the polymer scale preventive agent described above is preferably added (D) a water-soluble polymeric compound and/or (E) at least one compound selected from the group consisting of a colloidal silica and an alkali metal silicate. More preferably, the (D) and (E) are used in combination. Presumably, these additives interact with the condensation product of the components (A) and (B), so that the component (D) improves hydrophilic nature of the surface of the coating and the component (E) increases the adhesion of the coating to the inner wall, etc. of the polymerization vessel.

(D) Water-soluble Polymeric Compound

The water-soluble polymeric compounds include, for example, amphoteric polymeric compounds such as gelatin and casein, anionic polymeric compounds such as polyacrylic acid, polystyrenesulfonic acid, carboxymethyl cellulose, and alginic acid, cationic polymeric nitrogen-containing polymeric compounds such as polyvinylpyrrolidone and polyacrylamide, hydroxyl-containing polymeric compounds such as polyvinyl alcohol, hydroxyethyl cellulose, hydroxypropyl cellulose and pectin.

Among the water-soluble polymeric compounds above, preferred are gelatin, casein, polyacrylic acid, carboxymethyl cellulose, polyvinylpyrrolidone and pectin.

The amount of the water-soluble polymeric compound (D) is preferably in the range of 0.01 to 10 parts by weight, and more preferably from 0.05 to 2 parts by weight per part by weight of the condensation product of the components (A) and (B).

(E) At Least One Compound Selected From The Group Consisting Of Colloidal Silica And Alkali Metal Silicate Colloidal silica is a colloid in which ultrafine particles of silicon dioxide (silica) are dispersed in an aqueous medium or a non-aqueous medium such as methanol, propanol, ethylene glycol, or the like. The colloidal particles generally have a particle diameter of 1 to 100 mμ.

It is well-known that colloidal silica, for example, dispersed in an aqueous medium can be typically produced by adding hydrochloric acid to an aqueous sodium silicate solution, but production methods are not limited thereto. Any production methods can be used as long as the colloidal silica described above is produced.

The silicates of alkali metals include, for example, metasilicates ($M_2SiO_3$), orthosilicates ($M_4SiO_4$), bisilicates ($M_2Si_2O_5$), trisilicates ($M_3Si_3O_7$) and sesquisilicates ($M_4Si_3O_{10}$) of alkali metals such as lithium, sodium and potassium (where M stands for an alkali metal such as lithium, sodium or potassium), and water glass.

The amount of the component (E) is preferably in the range of 0.01 to 10 parts by weight, more preferably from 0.05 to 5 parts per part by weight of the condensation product of the components (A) and (B).

The water-soluble polymeric compound (D) may be added without any component (E), but it is preferably combined with the colloidal silica and/or the alkali metal silicate (E). Where the water-soluble polymeric compound is used in combination with the colloidal silica, the colloidal silica is used in an amount of preferably 5 to 3,000 parts by weight, more preferably 50 to 1,000 parts by weight per 100 parts by weight of the water-soluble polymeric compound. Where the water-soluble polymeric compound is used in combination with the alkali metal silicate, the alkali metal silicate is used in an amount of preferably 5 to 3,000 parts by weight, more preferably 50 to 1,000 parts by weight per 100 parts by weight of the water-soluble polymeric compound.

Furthermore, the polymer scale preventive agent may optionally contains one or more inorganic colloids other than the colloidal silica mentioned above, including, for example, gold colloid, silver colloid, silver iodide sol, selenium colloid, sulfur colloid, and colloids of oxides of metals such as, e.g., aluminum, thorium, titanium, antimony, tin and iron.

Formation of the coating

The polymer scale preventive agent is applied to the inner walls of a polymerization vessel and then dried sufficiently at a temperature from room temperature to 100° C., for instance, followed by washing with water if necessary, to form the coating.

The polymer scale preventive agent is preferably applied to not only the inner wall surfaces of a polymerization vessel but also other areas with which the monomer comes into contact during polymerization to form the coating on such areas. For example, on a stirring shaft, stirring blades, condensers, headers, search coil, bolts, nuts, etc.

More preferably, for formation of the coating, the polymer scale preventive agent is applied to areas with which monomers does not come into contact during polymerization but on which polymer scale may deposit, for example, the areas with which unreacted monomers comes into contact of an unreacted monomer recovery system; specifically the inner surfaces, etc. of equipment and pipes of the recovery system. Specifically, such areas include the inner surfaces of monomer distillation columns, condensers, monomer stock tanks and valves.

The method of applying the scale preventing agent is not particularly limited, and includes, for example, the brush coating, spray coating, the method of filing the polymerization vessel with the coating solution followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the polymer scale preventive agent, is not limited, either. Following methods can be used. That is, a method in which, after the solution is applied, hot air with an suitable elevated temperature is blown to the coated surface, and a method in which the inner wall surface of a polymerization vessel and the surfaces of other parts to be coated are previously heated to from 30° to 80° C., and the polymer scale preventive agent is directly applied to the heated inner wall surfaces, etc. After dried, the coated surfaces are washed with water if necessary.

The coating thus obtained normally has a coating weight of normally 0.001 $g/m^2$ to 5 $g/m^2$, and preferably from 0.05 to 2 $g/m^2$.

The coating operation may be conducted every one to ten-odd batches of polymerization. The formed coating has good durability and retains the scale-preventing action; therefore the coating operation may be performed every several batches of polymerization. Thus, the polymerization vessel can be used repeatedly without deposition of polymer scale, and productivity is improved.

Polymerization

After the formation of the coating on the inner wall surfaces of a polymerization vessel, and preferably other parts with which monomer may come into contact during polymerization, polymerization is carried out in accordance with conventional procedures. That is, a monomer having an ethylenically unsaturated double bond, a polymerization initiator, and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomer having an ethylenically unsaturated double bond to which of this invention can be applied may include, for example, vinyl halides such as vinyl chloride; vinyl esters such as vinyl acetate and vinyl propionate; acrylic acid, methacrylic acid, and esters or salts thereof; maleic acid, fumaric acid, and esters or salts thereof; and diene monomers such as butadiene, chloroprene and isoprene; styrene, acrylonitrile, vinylidene halides such as vinylidene chloride, and vinyl ethers. These may be used singly or in combination of two or more.

There are no particular limitations on the type of polymerization to which this invention can be applied. The present invention is effective in any type of polymerization such as suspension polymerization, emulsion polymerization, solution polymerization, bulk polymerization, and gas phase polymerization. Particularly, the present invention is more suitable to polymerizations in an aqueous medium such as suspension or emulsion polymerization.

In the following, general conditions are described on each type of polymerizations.

In the case of suspension or emulsion polymerization, first, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged (whereupon the pressure inside the polymerization vessel usually becomes from 0.5 to 30 kgf/cm$^2$.G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to from 0 to 7 kgf/cm$^2$.G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from –10° C. to 250° C. Specific methods of the bulk polymerization includes, for example, liquid bulk polymerization and gas phase polymerization.

The present invention makes it possible to prevent polymer scale from depositing, independent of materials constituting the inner wall, etc. of a polymerization vessel. For example, this invention can prevent deposition of polymer scale even in the case polymerization is carried out in a polymerization vessel made of a steel including stainless steel or lined with glass.

Any additive materials that have been conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α' -azobis-2,4-dimethylvaleronitrile, potassium peroxodisulfate, ammonium peroxodisulfate, and p-menthane hydroperoxide; suspension agents comprised of natural or synthetic polymeric compounds such as partially saponified polyvinyl alcohols, polyacrylic acids, vinyl acetate/maleic anhydride copolymers, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

Addition to polymerization mass

The polymer scale preventive agent of the present invention may be added to a polymerization mass in addition to the formation of the coating, so that the scale preventing effect is further improved. The amount of the polymer scale preventive agent to be added to the polymerization mass preferably in the range of about 10 to about 1,000 ppm based on the whole weight of the monomers charged. The polymer scale preventive agent is normally added in the form of liquid like the polymer scale preventive agent described above, although the form thereof is not limited. The addition should be conducted so that it may not adversely affect the quality of polymeric products to be obtained with respect to fish eyes, bulk density, particle size distribution, etc.

EXAMPLES

The working examples of the present invention and comparative examples will now be described below. In each table below, experiments marked with * are comparative examples and the other experiments are working examples of the present invention.

Production Example 1

Production of Condensation Product No.1

An autoclave was charged with 980 g of methanol and 10 g of 1,8-diaminonaphthalene as the aromatic amine compound (A-2), and they were stirred, so that the 1,8-diaminonaphthalene was dissolved in the methanol.

The methanol solution thus obtained was added with 1 g of p-benzoquinone as the quinone compound (B), and the mixture obtained was heated to 50° C., subjected to reaction at 50° C. for 5 hours, and then cooled. Thus, a methanol solution of Condensation Product No.1 was obtained.

Production of Condensation Product Nos.2–15

In each production, the procedure of Production Condensation Product No.1 was repeated, except for using an aromatic amine compound (A-2) and a quinone compound (B) given in Table 1 and a solvent given in Table 2 under conditions given in Table 2 (total concentration, (A- 1):(A-2):(B) ratio, reaction temperature and reaction time). Thus, Condensation Product Nos.2 to 15 were obtained.

Production of Condensation Product No.16(control)

In accordance with Japanese Patent Publication (kokoku) No.60-30681(1985), a condensation product of aniline and nitrobenzene named the condensation product No.1 was reproduced. The product obtained is herein referred to Condensation Product No.16.

Production of Condensation Product No.17(control)

In accordance with Japanese Pre-examination Patent Publication (kokai) No.61-7309(1986), particularly Production Example 8 of Experiment 12 in Example 1, a condensation product of 1,8-diaminonaphthalene and β-naphthoquinone was reproduced. The product obtained is herein referred to Condensation Product No.17.

TABLE 1

| Condensation product No. | (A) Aromatic amine compound | | (B) Quinone compound |
|---|---|---|---|
| | (A-1) | (A-2) | |
| 1 | — | 1,8-Diaminonaphthalene | p-Benzoquinone |
| 2* | — | 1,8-Diaminonaphthalene | — |
| 3* | — | — | p-Benzoquinone |
| 4 | — | α-Naphthylamine | p-Benzoquinone |
| 5 | — | β-Naphthylamine | p-Benzoquinone |
| 6 | — | 1,5-Diaminonaphthalene | p-Benzoquinone |
| 7 | — | 2,3-Diaminonaphthalene | p-Benzoquinone |
| 8 | — | 1,8-Diaminonaphthalene | Lawson |
| 9 | — | 1,8-Diaminonaphthalene | o-Benzoquinone |
| 10 | — | α-Naphthylamine | Juglone |
| 11 | — | α-Naphthylamine | α-Naphthoquinone |
| 12 | — | β-Naphthylamine | β-Naphthoquinone |
| 13 | — | 1,8-Diaminonaphthalene | α-Naphthoquinone |
| 14 | — | 1,8-Diaminonaphthalene | Hydroxy-p-benzoquinone |
| 15 | — | 1,8-Diaminonaphthalene | Duroquinone |

TABLE 2

| Condensation product No. | Solvent (wt. ratio) | Total conc. of (A-2) + (B) (wt. %) | (A-1):(A-2):(B) (wt. ratio) | Reaction temperature (°C.) | Reaction time (Hr) |
|---|---|---|---|---|---|
| 1 | Methanol | 1.1 | —:100:10 | 50 | 5 |
| 2* | Methanol | 1.1 | — | 50 | 5 |
| 3* | Methanol | 1.1 | — | 50 | 5 |
| 4 | Methanol | 2.0 | —:100:5 | 50 | 5 |
| 5 | Methanol:Water (50:50) | 2.0 | —:100:10 | 30 | 10 |
| 6 | Methanol:Water (70:30) | 2.0 | —:100:10 | 30 | 50 |
| 7 | Methanol | 2.0 | —:100:20 | 70 | 3 |
| 8 | Methanol | 1.0 | —:100:30 | 100 | 1 |
| 9 | Methanol | 1.0 | —:100:5 | 100 | 0.5 |
| 10 | Methanol | 1.0 | —:100:20 | 80 | 2 |
| 11 | Methanol:Water (80:20) | 3.0 | —:100:5 | 150 | 0.5 |
| 12 | Methanol | 1.5 | —:100:10 | 30 | 20 |
| 13 | Methanol | 2.0 | —:100:20 | 50 | 5 |
| 14 | Methanol | 2.0 | —:100:50 | 25 | 20 |
| 15 | Methanol | 1.1 | —:100:60 | 40 | 10 |

Example 1 (Experiment Nos. 101 to 118)

In each experiment, polymerization was conducted using a stainless steel polymerization vessel with an inner capacity of 1,000 liters and having a stirrer, as described below.

First, a polymer scale preventive agent as shown in Table 3 (solvent composition, concentration and pH was prepared using a condensation product, a solvent and alkaline compound given in Table 3. The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

Thereafter, into the polymerization vessel in which the coating was formed as above, 400 kg of water, 200 kg of vinyl chloride, 250 g of a partially saponified polyvinyl alcohol, 25 g of hydroxypropyl methyl cellulose and 70 g of 3,5,5-trimethylhexanoyl peroxide were charged, followed by polymerization at 66° C. for 6 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 5 times. After the 5th batch, the amount of polymer scale on an area located in the liquid phase during polymerization and on an area in the vicinity of the interface between the gas and liquid phases, was measured according the method below.

—Measurement of the amount of polymer scale

The scale deposited in an area of 10 cm square on the inner wall is scraped off with a stainless steel spatula as completely as possible to be confirmed with naked eyes, and then the scraped scale is weighted on a balance. Thereafter, the amount of the deposited scale per area of 1 $m^2$ is obtained by multiplying the measured value by 100.

The number of fish eyes which may appear when a polymer is formed into sheet was measured with respect to the polymers produced in the experiments according to the method below.

—Measurement of fish eyes

A hundred parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The sheet is examined for the number of fish eyes per 100 $cm^2$ by light transmission.

Further, to evaluate initial coloration at the time a polymer is formed into sheet, luminosity index L was measured according to the method below.
—Measurement of luminosity index L A hundred parts by weight of a polymer, 1 part by weight of a tin laurate stabilizing agent (trade name: TS- 101, product of Akisima Chemical Co.) and 0.5 part by weight of cadmium stabilizing agent (trade name: C-100J, product of Katsuta Kako Co.), and 50 parts by weight of DOP are kneaded at 160° C. for 5 minutes with a twin roll mill, and then formed into a sheet 1 mm thick. Subsequently, this sheet is placed in a mold measuring 4 cm× 4 cm×1.5 cm (depth), and molded under heating at 160° C. and a pressure of 65 to 70 kgf/cm² to prepare a test specimen. This test specimen is measured for luminosity index L in the Hunter's color difference equation described in JIS Z 8730 (1980). The lower initial coloration, the more the value of L.

The value of L was determined as follows. The stimulus value Y of XYZ color system is determined according to the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 is adopted. Next, L is calculated based on the equation: $L=10Y^{1/2}$ described in JIS Z 8730 (1980).

The results are given in Table 4.

TABLE 3

Polymer scale preventive agent

| Exp. No. | Condensation product No. | Solvent (wt. ratio) | Concentration (wt. %) | Alkaline compound | pH |
|---|---|---|---|---|---|
| 101 | 1 | Water:Methanol (80:20) | 0.2 | Ethylenediamine | 9.5 |
| 102* | 2 | Water:Methanol (80:20) | 0.2 | Ethylenediamine | 9.5 |
| 103* | 3 | Water:Methanol (80:20) | 0.2 | Ethylenediamine | 9.5 |
| 104 | 4 | Water:Methanol (90:10) | 0.2 | NaOH | 9.5 |
| 105 | 5 | Water:Methanol (90:10) | 0.2 | KOH | 9.0 |
| 106 | 6 | Water:Methanol (70:30) | 0.1 | Triethanolamine | 9.0 |
| 107 | 7 | Water:Methanol (80:20) | 0.3 | NaOH | 10.0 |
| 108 | 8 | Water:Methanol (80:20) | 0.1 | Monoethanolamine | 10.0 |
| 109 | 9 | Water:Methanol (80:20) | 0.05 | NH₄OH | 10.0 |
| 110 | 10 | Water:Methanol (80:20) | 0.1 | LiOH | 11.0 |
| 111 | 11 | Water:Methanol (80:20) | 0.2 | Na₂CO₃ | 11.0 |
| 112 | 12 | Water:Methanol (80:20) | 0.2 | NaOH | 11.5 |
| 113 | 13 | Water:Methanol (90:10) | 0.2 | Ethylenediamine | 12.0 |
| 114 | 14 | Water:Methanol (70:30) | 0.3 | NaOH | 12.5 |
| 115 | 15 | Water:Methanol (70:30) | 0.5 | KOH | 12.0 |
| 116* | 16 | Water:Methanol (80:20) | 0.2 | Ethylenediamine | 9.5 |
| 117* | 17 | DMAC:Acetone (80:20) | 0.3 | — | 6.0 |
| 118* | 1 | Water:Methanol (80:20) | 0.2 | — | 6.0 |

DMAC: Dimethylacetamide

TABLE 4

Results after 5th polymerization batch

| Exp. No. | Scale amount (g/m²) Liquid phase | Scale amount (g/m²) Around interface of gas-liquid phases | No. of fish eyes | L value |
|---|---|---|---|---|
| 101 | 0 | 8 | 7 | 72.6 |
| 102* | 54 | 530 | 30 | 72.3 |
| 103* | 62 | 610 | 33 | 72.8 |
| 104 | 0 | 8 | 7 | 72.6 |
| 105 | 0 | 9 | 8 | 72.6 |
| 106 | 0 | 8 | 7 | 72.7 |

TABLE 4-continued

Results after 5th polymerization batch

| Exp. No. | Scale amount (g/m²) Liquid phase | Scale amount (g/m²) Around interface of gas-liquid phases | No. of fish eyes | L value |
|---|---|---|---|---|
| 107 | 0 | 8 | 8 | 72.5 |
| 108 | 0 | 9 | 8 | 72.7 |
| 109 | 0 | 20 | 10 | 72.8 |
| 110 | 0 | 9 | 7 | 72.7 |
| 111 | 0 | 9 | 8 | 72.7 |
| 112 | 0 | 10 | 8 | 72.7 |
| 113 | 0 | 9 | 8 | 72.6 |
| 114 | 0 | 9 | 9 | 72.5 |
| 115 | 0 | 7 | 10 | 72.3 |
| 116* | 0 | 360 | 30 | 69.8 |
| 117* | 7 | 280 | 29 | 71.3 |
| 118* | 5 | 120 | 27 | 71.4 |

Example 2 (Experiment Nos. 201 to 116)

In each experiment, polymerization was conducted using a stainless steel polymerization vessel with an inner capacity of 20 liters and having a stirrer, as described below.

First, a polymer scale preventive agent as shown in Table 5 (solvent composition, concentration and pH) was prepared using a condensation product, solvent and alkaline compound given in Table 5. The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

Thereafter, into the polymerization vessel in which the coating was formed as above, 9 kg of water, 225 g of sodium dodecylbenzenesulfonate, 12 g of t-dodecyl mercaptan and 13 g of potassium peroxodisulfate were charged. After the inside of the polymerization vessel was replaced with a nitrogen gas, 1.3 kg of styrene and 3.8 kg of butadiene were charged, followed by polymerization at 50° C. for 20 hours.

After the completion of the polymerization, the produced polymer was taken out and unreacted monomer was recovered out of the polymerization vessel. Subsequently, the inside of the polymerization vessel was washed with water and residual resin was removed.

The batch comprising the operations from forming a coating through polymerizing to washing with water was repeated 3 times. After the 3th batch, the amount of polymer scale on an area located in the liquid during polymerization and on an area in the vicinity of the interface between the gas and liquid phases, was measured in the same manner as in Example 1.

Further, to evaluate initial coloration at the time a polymer is formed into sheet, luminosity index L was measured according to the method below.

The results are given in Table 6.

—Measurement of luminosity index L

To 1 kg of a polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a mold measuring 9×9×0.1 cm (depth), heated at 195° C. under a pressure of 50 to 60 kgf/cm$^2$ and press molded under the final pressure of 80 kgf/cm$^2$ to prepare a test specimen.

This test specimen was measured for luminosity index L in the same manner as in Example 1.

Production Example 2

Production of Condensation Product No.18

An autoclave was charged with 490 g of methanol and 5 g of 3,5-diaminobenzoic acid as the aromatic amine compound (A-1) and 5 g of p-benzoquinone as the quinone compound (B), and they were heated to 30° C. subjected to reaction at 30° C. for 20 hours, and then cooled. Thus, a solution of Condensation Product No.18 was obtained.

Production of Condensation Product Nos.19–43

In each production, the procedure of Production Condensation Product No.18 was repeated, except for using an aromatic amine compound (A-1) or (A-2) and a quinone compound (B) given in Table 7 and a solvent given in Table 8 under conditions given in Table 8 (total concentration, (A-1):(A-2):(B) ratio, reaction temperature and reaction time). Thus, Condensation Product Nos.19 to 43 were obtained.

TABLE 5

| | Polymer scale preventive agent | | | | |
|---|---|---|---|---|---|
| Exp. No. | Condensation product No. | Solvent (wt. ratio) | Concentration (wt. %) | Alkaline compound | pH |
| 201 | 1 | Water:Methanol (80:20) | 0.3 | Ethylenediamine | 9.5 |
| 202* | 2 | Water:Methanol (80:20) | 0.3 | Ethylenediamine | 9.5 |
| 203* | 3 | Water:Methanol (80:20) | 0.3 | Ethylenediamine | 9.5 |
| 204 | 4 | Water:Methanol (70:30) | 0.3 | Triethanolamine | 9.5 |
| 205 | 5 | Water:Methanol (90:10) | 0.2 | NaOH | 10.0 |
| 206 | 6 | Water:Methanol (90:10) | 0.2 | KOH | 10.0 |
| 207 | 7 | Water:Methanol (80:20) | 0.2 | NaOH | 10.5 |
| 208 | 8 | Water:Methanol (80:20) | 0.2 | Monoethanolamine | 10.5 |
| 209 | 9 | Water:Methanol (80:20) | 0.1 | LiOH | 11.0 |
| 210 | 10 | Water:Methanol (80:20) | 0.05 | NH$_4$OH | 11.0 |
| 211 | 11 | Water:Methanol (80:20) | 0.2 | KOH | 12.0 |
| 212 | 12 | Water:Methanol (70:30) | 0.2 | NaOH | 12.5 |
| 213 | 13 | Water:Methanol (70:30) | 0.2 | Triethanolamine | 10.5 |
| 214 | 14 | Water:Methanol (70:30) | 0.2 | Monoethanolamine | 10.5 |
| 215 | 15 | Water:Methanol (70:30) | 0.3 | Ethylenediamine | 10.5 |
| 216* | 1 | Water:Methanol (80:20) | 0.3 | — | 6.0 |

TABLE 6

| | Results after 3rd polymerization batch | | |
|---|---|---|---|
| | Scale amount (g/m$^2$) | | |
| Exp. No. | Liquid phase | Around interface of gas-liquid phases | L value |
| 201 | 0 | 10 | 85.5 |
| 202* | 15 | 310 | 84.7 |
| 203* | 47 | 510 | 85.7 |
| 204 | 0 | 12 | 85.5 |
| 205 | 0 | 16 | 85.5 |
| 206 | 0 | 15 | 85.5 |
| 207 | 0 | 11 | 85.6 |
| 208 | 0 | 13 | 85.5 |
| 209 | 0 | 16 | 85.6 |
| 210 | 0 | 18 | 85.7 |
| 211 | 0 | 14 | 85.5 |
| 212 | 0 | 15 | 85.5 |
| 213 | 0 | 15 | 85.5 |
| 214 | 0 | 12 | 85.5 |
| 215 | 0 | 10 | 85.5 |
| 216* | 12 | 130 | 84.4 |

TABLE 7

| Condensation product No. | (A) Aromatic amine compound | | (B) Quinone compound |
|---|---|---|---|
| | (A-1) | (A-2) | |
| 18 | 3,5-Diaminobenzoic acid | — | p-Benzoquinone |
| 19 | 1,5-Naphthylenediamine-2-carboxylic acid | — | p-Benzoquinone |
| 20 | 2,5-Diaminoterephthalic acid | — | Bromo-p-benzoquinone |
| 21 | 3,4-Diaminobenzoic acid | — | Lawson |
| 22 | 4,6-Diaminobenzoic acid | — | α-Naphtoquinone |
| 23 | 3,5-Diaminobenzoic acid | — | Plumbagin |
| 24 | 2,5-Diaminobenzenesulfonic acid | — | p-Benzoquinone |
| 25 | 1,2-Naphthylenediamine-7-sulfonic acid | — | Duroquinone |
| 26 | 1,5-Naphthylenediamine-4-sulfonic acid | — | β-Naphthoquinone |
| 27 | 1,6-Naphthylenediamine-4-sulfonic acid | — | Lawson |
| 28 | 2,4-Diaminobenzenesulfonic acid | — | α-Naphthoquinone |
| 29 | p-Aminophenol | — | p-Benzoquinone |
| 30 | p-Aminosalicylic acid | — | p-Benzoquinone |
| 31 | p-Aminophenol | — | α-Naphthoquinone |
| 32 | 2,5-Diaminobenzoic acid | — | α-Naphthoquinone |
| 33 | p-Aminobenzenesulfonic acid | — | α-Naphthoquinone |
| 34 | p-Aminosalicylic acid | — | Juglone |
| 35 | m-Aminophenol | — | Lawson |
| 36 | 2-Naphthylamine-1-sulfonic acid | — | Bromo-p-benzoquinone |
| 37 | o-Aminophenol | — | p-Benzoquinone |
| 38 | 2-Amino-1-phenol-4-sulfonic acid | — | p-Benzoquinone |
| 39 | p-Aminophenol | — | o-Benzoquinone |
| 40 | o-Aminophenol | — | p-Toluquinone |
| 41 | m-Aminophenol | — | Duroquinone |
| 42 | — | 1,8-Diaminonaphthalene | p-Benzoquinone |
| 43 | — | m-Phenylenediamine | Lawson |

TABLE 8

| Condensation product No. | Solvent (wt. ratio) | Total conc. of (A-1) + (B) (wt. %) | (A-1):(A-2):(B) (wt. ratio) | Reaction temperature (°C.) | Reaction time (Hr) |
|---|---|---|---|---|---|
| 18 | Methanol | 2.0 | 100:—:100 | 30 | 20 |
| 19 | Methanol | 2.0 | 100:—:50 | 30 | 40 |
| 20 | Methanol | 2.0 | 100:—:100 | 50 | 30 |
| 21 | Methanol:Water (70:30) | 4.0 | 100:—:100 | 50 | 10 |
| 22 | Methanol | 2.0 | 100:—:150 | 60 | 15 |
| 23 | Methanol | 1.0 | 100:—:10 | 80 | 5 |
| 24 | Methanol:Water (50:50) | 2.0 | 100:—:50 | 80 | 20 |
| 25 | Methanol:Water (70:30) | 2.0 | 100:—:200 | 80 | 20 |
| 26 | Methanol:Water (70:30) | 0.5 | 100:—:300 | 40 | 20 |
| 27 | Methanol:Water (70:30) | 2.0 | 100:—:100 | 50 | 30 |
| 28 | Methanol:Water (50:50) | 2.0 | 100:—:100 | 50 | 40 |
| 29 | Methanol:Water (95:5) | 3.0 | 100:—:20 | 50 | 15 |
| 30 | Methanol:Water (95:5) | 3.0 | 100:—:30 | 40 | 20 |
| 31 | Methanol:Water (90:10) | 1.0 | 100:—:30 | 30 | 40 |
| 32 | Methanol:Water (80:20) | 1.0 | 100:—:50 | 20 | 60 |
| 33 | Methanol:Water | 1.0 | 100:—:100 | 100 | 5 |

TABLE 8-continued

| Condensation product No. | Solvent (wt. ratio) | Total conc. of (A-1) + (B) (wt. %) | (A-1):(A-2):(B) (wt. ratio) | Reaction temperature (°C.) | Reaction time (Hr) |
| --- | --- | --- | --- | --- | --- |
| | (60:40) | | | | |
| 34 | Methanol | 2.0 | 100:—:50 | 40 | 25 |
| 35 | Methanol | 2.0 | 100:—:200 | 40 | 50 |
| 36 | Methanol:Water (50:50) | 2.0 | 100:—:100 | 40 | 50 |
| 37 | Methanol:Water (95:5) | 2.0 | 100:—:50 | 40 | 50 |
| 38 | Methanol:Water (60:40) | 2.0 | 100:—:30 | 40 | 50 |
| 39 | Methanol | 2.5 | 100:—:20 | 30 | 50 |
| 40 | Methanol | 2.5 | 100:—:30 | 30 | 25 |
| 41 | Methanol | 3.0 | 100:—:50 | 100 | 0.5 |
| 42 | Methanol | 2.0 | —:100:100 | 40 | 15 |
| 43 | Methanol:Water (80:20) | 2.0 | —:100:20 | 40 | 15 |

Example 3 (Experiment Nos. 301 to 327)

In each experiment, polymerization was conducted using a stainless steel polymerization vessel with an inner capacity of 2,000 liters and having a stirrer, as described below.

First, a polymer scale preventive agent was prepared using a condensation product, a solvent and an alkaline compound given in Table 9 under conditions given in Table 9 (solvent composition, concentration and pH). The polymer scale preventive agent was applied to the inner wall, the stirring shaft, the stirring blades and other areas with which a monomer comes into contact of the polymerization vessel. The applied polymer scale preventive agent was dried by heating at 50° C. for 15 minutes to form a coating, which was then washed with water.

In the polymerization vessel in which the coating was formed as above, polymerization was carried out in the same manner as in Example 1. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 20 times, except for Experiment No. 327. After the 20th batch, the amount of polymer scale on an area located in the liquid phase during polymerization and on an area in the vicinity of the interface between the gas and liquid phases, was measured in the same manner as in Example 1. In Experiment of No.327 marked with *, the amount of polymer scale was measured after the 10th batch. The number of fish eyes which may appear when a polymer is formed into sheet was measured with respect to the polymers produced in the experiments in the same manner as in Example 1.

Further, to evaluate initial coloration at the time a polymer is formed into sheet, luminosity index L was measured in the same manner as in Example 1.

The results are given in Table 10.

TABLE 9

| Exp. No. | Condensation product No. | Solvent (wt. ratio) | Concentration (wt. %) | Alkaline compound | pH |
|---|---|---|---|---|---|
| 301 | 18 | Water:Methanol (90:10) | 0.3 | NaOH | 9.5 |
| 302 | 19 | Water:Methanol (90:10) | 0.3 | NaOH | 9.5 |
| 303 | 20 | Water:Methanol (90:10) | 0.3 | NaOH | 10.0 |
| 304 | 21 | Water:Methanol (85:15) | 0.2 | Ethylenediamine | 10.0 |
| 305 | 22 | Water:Methanol (85:15) | 0.4 | KOH | 8.5 |
| 306 | 23 | Water:Methanol (85:15) | 0.5 | KOH | 8.0 |
| 307 | 24 | Water | 0.5 | Ethylenediamine | 10.0 |
| 308 | 25 | Water:Methanol (90:10) | 0.2 | NaOH | 9.5 |
| 309 | 27 | Water:Methanol (90:10) | 0.4 | NaOH | 11.0 |
| 310 | 27 | Water:Methanol (95:5) | 0.3 | Ethylenediamine | 12.0 |
| 311 | 28 | Water:Methanol (95:5) | 0.3 | NaOH | 12.0 |
| 312 | 29 | Water:Methanol (90:10) | 0.3 | NaOH | 10.0 |
| 313 | 30 | Water:Methanol (90:10) | 0.3 | NaOH | 9.5 |
| 314 | 31 | Water:Acetone (95:5) | 0.4 | KOH | 9.0 |
| 315 | 32 | Water:Methanol (90:10) | 0.5 | KOH | 9.0 |
| 316 | 33 | Water:Methanol (80:20) | 0.2 | KOH | 9.0 |
| 317 | 34 | Water:Methanol (80:20) | 0.1 | NaOH | 8.5 |
| 318 | 35 | Water:Methanol (80:20) | 0.3 | Ethylenediamine | 11.0 |
| 319 | 36 | Water:Methanol (90:10) | 0.3 | NaOH | 12.0 |
| 320 | 37 | Water:Methanol (90:10) | 0.3 | Ethylenediamine | 12.5 |
| 321 | 38 | Water:Methanol (90:10) | 0.3 | NaOH | 12.5 |
| 322 | 39 | Water:Methanol (80:20) | 0.2 | Triethanolamine | 9.0 |
| 323 | 40 | Water:Methanol (80:20) | 0.2 | NaOH | 12.5 |
| 324 | 41 | Water:Methanol (80:20) | 0.2 | NaOH | 10.5 |
| 325 | 42 | Water:Methanol (80:20) | 0.2 | NaOH | 9.0 |
| 326 | 43 | Water:Methanol (80:20) | 0.2 | Ethylenediamine | 9.5 |
| 327* | 18 | Water:Methanol (90:10) | 0.3 | — | 5.5 |

*After 10th polymerization batch.

TABLE 10

| | Results after 20th polymerization batch | | | |
|---|---|---|---|---|
| | Scale amount (g/m²) | | No. of | |
| Exp. No. | Liquid phase | Around interface of gas-liquid phases | fish eyes | L value |
| 301 | 0 | 7 | 7 | 72.6 |
| 302 | 0 | 10 | 8 | 72.5 |
| 303 | 0 | 8 | 7 | 72.6 |
| 304 | 0 | 7 | 7 | 72.6 |
| 305 | 0 | 8 | 7 | 72.5 |
| 306 | 0 | 13 | 8 | 72.5 |
| 307 | 0 | 10 | 8 | 72.5 |
| 308 | 0 | 7 | 7 | 72.5 |
| 309 | 0 | 8 | 7 | 72.5 |
| 310 | 0 | 14 | 9 | 72.5 |
| 311 | 0 | 13 | 8 | 72.5 |
| 312 | 0 | 9 | 7 | 72.6 |
| 313 | 0 | 10 | 7 | 72.5 |
| 314 | 0 | 9 | 7 | 72.5 |
| 315 | 0 | 9 | 7 | 72.5 |
| 316 | 0 | 17 | 9 | 72.6 |
| 317 | 0 | 15 | 9 | 72.6 |
| 318 | 0 | 11 | 8 | 72.5 |
| 319 | 0 | 10 | 8 | 72.5 |
| 320 | 0 | 13 | 9 | 72.5 |
| 321 | 0 | 10 | 7 | 72.4 |
| 322 | 0 | 18 | 11 | 72.5 |
| 323 | 0 | 13 | 9 | 72.6 |
| 324 | 0 | 19 | 12 | 72.5 |
| 325 | 0 | 58 | 24 | 72.1 |
| 326 | 0 | 52 | 23 | 72.2 |
| 327* | 18 | 105 | 26 | 71.1 |

*After 10th polymerization batch.

Example 4 (Experiment Nos. 401 to 422)

In each experiment, polymerization was conducted using a stainless steel polymerization vessel with an inner capacity of 20 liters and having a stirrer, as described below.

First, a polymer scale preventive agent was prepared using a condensation product, a solvent and an alkaline compound given in Table 11 under conditions given in Table 11 (solvent composition, concentration and pH). The polymer scale preventive agent was applied to the inner wall, the stirring shaft, the stirring blades and other areas with which a monomer comes into contact of the polymerization vessel. The applied polymer scale preventive agent was dried by heating at 50° C. for 15 minutes to form a coating, which was then washed with water.

In the polymerization vessel in which the coating was formed as above, polymerization was carried out in the same manner as in Example 2. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 10 times. After the 10th batch, the amount of polymer scale on an area located in the liquid phase during polymerization and on an area in the vicinity of the interface between the gas and liquid phases, was measured in the same manner as in Example 1.

Further, to evaluate initial coloration at the time a polymer is formed into sheet, luminosity index L was measured in the same manner as in Example 2.

The results are given in Table 12.

TABLE 11

| Exp. No. | Condensation product No. | Solvent (wt. ratio) | Concentration (wt. %) | Alkaline compound | pH |
|---|---|---|---|---|---|
| 401 | 18 | Water:Methanol (85:15) | 0.3 | NaOH | 9.0 |
| 402 | 20 | Water:Methanol (90:10) | 0.3 | Ethylenediamine | 9.0 |
| 403 | 21 | Water:Methanol (90:10) | 0.05 | KOH | 10.0 |
| 404 | 22 | Water:Methanol (90:10) | 0.1 | Triethanolamine | 11.0 |
| 405 | 24 | Water:Methanol (90:10) | 0.3 | NaOH | 9.0 |
| 406 | 25 | Water:Methanol (95:5) | 0.3 | Ethylenediamine | 9.0 |
| 407 | 26 | Water:Methanol (90:10) | 0.3 | NaOH | 12.0 |
| 408 | 29 | Water:Methanol (90:10) | 0.3 | NaOH | 10.0 |
| 409 | 30 | Water:Methanol (90:10) | 0.3 | KOH | 10.0 |
| 410 | 31 | Water:Methanol (90:10) | 0.3 | KOH | 10.0 |
| 411 | 32 | Water:Methanol (90:10) | 0.1 | KOH | 9.0 |
| 412 | 33 | Water:Methanol (90:10) | 0.05 | Ethylenediamine | 11.0 |
| 413 | 34 | Water:Methanol (90:10) | 0.3 | Monoethanolamine | 12.0 |
| 414 | 35 | Water:Ethanol (80:20) | 0.5 | NaOH | 12.5 |
| 415 | 36 | Water:Acetone (80:20) | 0.3 | Triethanolamine | 12.0 |
| 416 | 37 | Water:Methanol (80:20) | 0.3 | KOH | 10.0 |
| 417 | 38 | Water:Methanol (80:20) | 0.3 | KOH | 10.0 |
| 418 | 39 | Water:Methanol (80:20) | 0.2 | NaOH | 9.5 |
| 419 | 40 | Water:Methanol (80:20) | 0.2 | NaOH | 9.5 |
| 420 | 41 | Water:Methanol (90:10) | 0.2 | NaOH | 10.5 |
| 421 | 42 | Water:Methanol (90:10) | 0.2 | NaOH | 10.5 |
| 422 | 43 | Water:Methanol (80:20) | 0.2 | Ethylenediamine | 10.5 |

TABLE 12

Results after 10th polymerization batch

| Exp. No. | Scale amount (g/m²) Liquid phase | Scale amount (g/m²) Around interface of gas-liquid phases | L value |
|---|---|---|---|
| 401 | 0 | 10 | 85.6 |
| 402 | 0 | 14 | 85.6 |
| 403 | 0 | 12 | 85.6 |
| 404 | 0 | 10 | 85.5 |
| 405 | 0 | 11 | 85.5 |
| 406 | 0 | 14 | 85.5 |
| 407 | 0 | 10 | 85.5 |
| 408 | 0 | 12 | 85.6 |
| 409 | 0 | 14 | 85.5 |
| 410 | 0 | 17 | 85.5 |
| 412 | 0 | 15 | 85.6 |
| 412 | 0 | 18 | 85.6 |
| 413 | 0 | 16 | 85.5 |
| 414 | 0 | 13 | 85.4 |
| 415 | 0 | 15 | 85.5 |
| 416 | 0 | 16 | 85.5 |
| 417 | 0 | 14 | 85.5 |
| 419 | 0 | 32 | 85.5 |
| 419 | 0 | 30 | 85.5 |
| 420 | 0 | 31 | 85.5 |
| 421 | 0 | 52 | 85.3 |
| 422 | 0 | 58 | 85.4 |

Production Example 3

Production of Condensation Product No.44

An autoclave was charged with 980 g of methanol, 10 g of p-aminophenol as the aromatic amine compound (A-1) and 8 g of 4-aminodiphenylamine as the aromatic amine compound (A-2), and they were stirred, so that the p-aminophenol and 4-aminodiphenylamine were dissolved in the methanol.

The methanol solution thus obtained was added with 2 g of p-benzoquinone as the quinone compound (B), and the mixture obtained was heated to 30° C., subjected to reaction at 30° C. for 50 hours, and then cooled. Thus, a methanol solution of Condensation Product No.44 was obtained.

Production of Condensation Product Nos.45–54

In each production, the procedure of Production Condensation Product No.44 was repeated, except for using aromatic amine compounds (A-1) and (A-2) and a quinone compound (B) given in Table 13 and a solvent given in Table 14 under conditions given in Table 14 (total concentration, (A-1):(A-2):(B) ratio, reaction temperature and reaction time). Thus, Condensation Product Nos.45 to 54 were obtained.

Production of Condensation Product No.55

An autoclave was charged with 980 g of methanol, 5 g of 4-aminodiphenylamine as the aromatic amine compound (A-2) and 10 g of p-aminobenzoic acid as the aromatic amine compound (A-1), and they were stirred, so that the 4-aminodiphenylamine and p-aminobenzoic acid were dissolved in the methanol.

The methanol solution thus obtained was added with 5 g of 2-hydroxy-1,4-naphthoquinone as the quinone compound (B), and the mixture obtained was heated to 50° C., subjected to reaction at 50° C. for 5 hours, and then cooled. Then, the reaction mixture was added with water in the amount which is five times the amount of the reaction mixture. Subsequently, the pH of the mixture was adjusted to 2 to 3 by the addition of 1% sulfuric acid, so that the condensation product was settled. The sediment thus formed was filtered off, washed with water and dried to give Condensation Product No.55.

Production of Condensation Product Nos.56–65

In each production, the procedure of Production Condensation Product No.55 was repeated, except for using aromatic amine compounds (A-1) and (A-2) and a quinone compound (B) given in Table 13 and a solvent given in Table 14 under conditions given in Table 14 (total concentration, (A-1):(A-2):(B) ratio, reaction temperature and reaction time). Thus, Condensation Product Nos.56 to 65 were obtained.

TABLE 13

| Condensation product No. | (A) Aromatic amine compound (A-1) | (A-2) | (B) Quinone compound |
|---|---|---|---|
| 44 | p-Aminophenol | 4-Aminodiphenylamine | p-Benzoquinone |
| 45 | p-Aminophenol | 2-Aminodiphenylamine | p-Benzoquinone |
| 46 | m-Aminophenol | 2-Aminodiphenylamine | p-Benzoquinone |
| 47 | o-Aminophenol | 4,4'-Diaminophenylamine | o-Benzoquinone |
| 48 | 4-Amino-2-aminophenol | 4-Aminodiphenylamine | p-Toluquinone |
| 49 | p-Aminophenol | m-Phenylenediamine | Hydorxy-p-benzoquinone |
| 50 | p-Aminophenol | 4-Aminodiphenylamine | Bromo-p-benzoquinone |
| 51 | 2-Nitro-4-aminophenol | 4-Aminodiphenylamine | Duroquinone |
| 52 | 4-Amino-2-aminophenol | p-Phenylenediamine | Chloro-p-benzoquinone |
| 53 | p-Aminophenol | m-Phenylenediamine | p-Benzoquinone |
| 54 | p-Aminophenol | 2,3-Diaminotoluene | p-Benzoquinone |
| 55 | p-Aminobenzoic acid | 4-Aminodiphenylamine | 2-Hydroxy-1,4-naphthoquinone |
| 56 | m-Aminobenzoic acid | 4-Aminodiphenylamine | o-Benzoquinone |
| 57 | p-Aminosalicylic acid | 1,8-Diaminonaphtalene | p-Benzoquinone |
| 58 | 3,5-Diaminonbenzoic acid | 2-Aminodiphenylamine | α-Naphthoquinon |
| 59 | 2,4-Diaminonbenzoic acid | α-Naphthylamine | Lawson |
| 60 | 2-Amino-5-naphthol-7-sulfonic acid | p-Phenylenediamine | p-Benzoquinone |
| 61 | 1-Amino-8-hydorxy-3,6-disulfonic acid | 4-Aminodiphenylamine | p-Benzoquinone |
| 62 | 2-Amino-8-naphthol-6-sulfonic acid | Aniline | 2-Hydroxy-1,4-naphthoquinone |
| 63 | p-Diaminobenzene-sulfonic acid | 4-Aminodiphenylamine | p-Benzoquinone |
| 64 | 2,5-Diaminobenzene-sulfonic acid | 1,8-Diaminonaphthalene | α-Naphthoquinon |
| 65 | 2,4-Diaminobenzene-sulfonic acid | 4-Aminodiphenylamine | p-Benzoquinone |

TABLE 14

| Condensation product No. | Solvent (wt. ratio) | Total conc. of (A-1) + (A-2) + (B) (wt. %) | (A-1):(A-2):(B) (wt. ratio) | Reaction temperature (°C.) | Reaction time (Hr) |
|---|---|---|---|---|---|
| 44 | Methanol | 2.0 | 100:80:20 | 30 | 50 |
| 45 | Methanol | 2.0 | 100:80:20 | 25 | 50 |
| 46 | Methanol | 3.0 | 100:200:50 | 50 | 5 |
| 47 | Methanol | 1.0 | 100:10:10 | 80 | 2 |
| 48 | Methanol | 0.5 | 100:30:50 | 130 | 0.5 |
| 49 | Methanol | 0.5 | 100:30:5 | 100 | 0.5 |
| 50 | Methanol:Water (80:20) | 1.0 | 100:100:10 | 50 | 0.5 |
| 51 | Methanol | 1.0 | 100:100:20 | 30 | 20 |
| 52 | Methanol | 2.0 | 100:50:20 | 40 | 30 |
| 53 | Methanol:Water (80:20) | 2.0 | 100:50:20 | 50 | 10 |
| 54 | Methanol | 2.5 | 100:80:10 | 50 | 5 |
| 55 | Methanol | 2.0 | 100:50:50 | 30 | 50 |
| 56 | Methanol:Water (80:20) | 1.0 | 100:100:50 | 50 | 15 |
| 57 | Methanol:Water (80:20) | 1.0 | 100:20:10 | 80 | 5 |
| 58 | Methanol:Water (80:20) | 2.0 | 100:30:200 | 60 | 5 |
| 59 | Methanol:Water (80:20) | 2.0 | 100:100:100 | 60 | 10 |
| 60 | Methanol | 2.0 | 100:33:10 | 30 | 40 |
| 61 | Methanol | 1.0 | 100:20:4 | 50 | 10 |
| 62 | Methanol:Water (80:20) | 2.0 | 100:50:15 | 50 | 7 |
| 63 | Methanol | 2.0 | 100:50:25 | 50 | 5 |
| 64 | Methanol:Water (70:30) | 2.0 | 100:20:500 | 30 | 30 |
| 65 | Methanol:Water | 2.0 | 100:50:1000 | 50 | 10 |

TABLE 14-continued

| Condensation product No. | Solvent (wt. ratio) | Total conc. of (A-1) + (A-2) + (B) (wt. %) | (A-1):(A-2):(B) (wt. ratio) | Reaction temperature (°C.) | Reaction time (Hr) |
|---|---|---|---|---|---|
| | (80:20) | | | | |

Example 5 (Experiment Nos. 501 to 522)

In each experiment, polymerization was conducted using a stainless steel polymerization vessel with an inner capacity of 1,000 liters and having a stirrer, as described below.

First, a polymer scale preventive agent was prepared using a condensation product, a solvent and an alkaline compound given in Table 15 under conditions given in Table 15 (solvent composition, concentration and pH). The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

In the polymerization vessel in which the coating was formed as above, polymerization was carried out in the same manner as in Example 1. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 50 times. After the 50th batch, the amount of polymer scale on an area located in the liquid phase during polymerization and on an area in the vicinity of the interface between the gas and liquid phases, was measured in the same manner as in Example 1.

The number of fish eyes which may appear when a polymer is formed into sheet was measured with respect to the polymers produced in the experiments in the same manner as in Example 1.

Further, to evaluate initial coloration at the time a polymer is formed into sheet, luminosity index L was measured in the same manner as in Example 1.

The results are given in Table 16.

TABLE 15

| | | Polymer scale preventive agent | | | |
|---|---|---|---|---|---|
| Exp. No. | Condensation product No. | Solvent (wt. ratio) | Concentration (wt. %) | Alkaline compound | pH |
| 501 | 44 | Water:Methanol (80:20) | 0.2 | NaOH | 9.5 |
| 502 | 45 | Water:Methanol (80:20) | 0.2 | NaOH | 9.5 |
| 503 | 46 | Water:Methanol (80:20) | 0.1 | KOH | 9.5 |
| 504 | 47 | Water:Methanol (90:10) | 0.05 | KOH | 11.0 |
| 505 | 48 | Water:Methanol (70:30) | 0.3 | $Na_2CO_3$ | 9.0 |
| 506 | 49 | Water:Methanol (80:20) | 0.5 | LiOH | 12.0 |
| 507 | 50 | Water:Methanol (80:20) | 0.2 | $Na_2SiO_3$ | 10.0 |
| 508 | 51 | Water:Methanol (80:20) | 0.2 | $NH_4OH$ | 10.5 |
| 509 | 52 | Water:Methanol (80:20) | 0.2 | NaOH | 9.0 |
| 510 | 53 | Water:Methanol (90:10) | 0.2 | NaOH | 11.5 |
| 511 | 54 | Water:Methanol (80:20) | 0.2 | Monoethanolamine | 9.5 |
| 512 | 55 | Water:Methanol (80:20) | 0.1 | Ethylenediamine | 9.5 |
| 513 | 56 | Water:Methanol (70:30) | 0.2 | NaOH | 11.0 |
| 514 | 57 | Water:Methanol (70:30) | 0.2 | Triethanolamine | 10.0 |
| 515 | 58 | Water:Methanol (90:10) | 0.2 | NaOH | 9.0 |
| 516 | 59 | Water:Methanol (90:10) | 0.2 | Ethylenediamine | 9.5 |
| 517 | 69 | Water:Methanol (80:20) | 0.2 | NaOH | 10.0 |
| 518 | 70 | Water:Methanol (70:30) | 0.3 | Monoethanolamine | 10.0 |
| 519 | 71 | Water:Methanol (90:10) | 0.2 | LiOH | 9.0 |
| 520 | 72 | Water:Methanol (90:10) | 0.2 | Ethylenediamine | 9.5 |
| 521 | 73 | Water:Methanol (70:30) | 0.2 | NaOH | 9.0 |
| 522 | 74 | Water:Methanol (80:20) | 0.2 | NaOH | 9.0 |

TABLE 16

| | Results after 50th polymerization batch | | | |
|---|---|---|---|---|
| | Scale amount (g/m²) | | No. of | |
| Exp. No. | Liquid phase | Around interface of gas-liquid phases | fish eyes | L value |
| 501 | 0 | 6 | 6 | 72.6 |
| 502 | 0 | 6 | 7 | 72.7 |
| 503 | 0 | 7 | 6 | 72.7 |
| 504 | 0 | 18 | 10 | 72.8 |
| 505 | 0 | 7 | 7 | 72.6 |
| 506 | 0 | 7 | 7 | 72.8 |
| 507 | 0 | 8 | 8 | 72.7 |
| 508 | 0 | 8 | 7 | 72.7 |
| 509 | 0 | 7 | 7 | 72.6 |
| 510 | 0 | 7 | 6 | 72.6 |
| 511 | 0 | 7 | 7 | 72.7 |
| 512 | 0 | 15 | 11 | 71.4 |
| 513 | 0 | 15 | 10 | 71.4 |
| 514 | 0 | 13 | 10 | 71.4 |

TABLE 16-continued

Results after 50th polymerization batch

| Exp. No. | Scale amount (g/m²) | | No. of fish eyes | L value |
|---|---|---|---|---|
| | Liquid phase | Around interface of gas-liquid phases | | |
| 515 | 0 | 12 | 8 | 71.7 |
| 516 | 0 | 14 | 9 | 71.8 |
| 517 | 0 | 12 | 9 | 71.4 |
| 518 | 0 | 16 | 11 | 71.4 |
| 519 | 0 | 16 | 10 | 71.4 |
| 520 | 0 | 15 | 10 | 71.3 |
| 521 | 0 | 11 | 8 | 71.8 |
| 522 | 0 | 10 | 8 | 71.8 | unreacted monomer was recovered out of the polymerization vessel. Subsequently, the inside of the polymerization vessel was washed with water and residual resin was removed.

The batch above comprising the operations from forming a coating through polymerizing to washing with water was repeated 15 times. After the 15th batch, the amount of polymer scale on an area located in the liquid phase during polymerization and on an area in the vicinity of the interface between the gas and liquid phases, was measured in the same manner as in Example 1.

Further, to evaluate initial coloration at the time a polymer is formed into sheet, luminosity index L was measured in the same manner as in Example 2.

The results are given in Table 18.

TABLE 17

| Exp. No. | Polymer scale preventive agent | | | | |
|---|---|---|---|---|---|
| | Condensation production No. | Solvent (wt. ratio) | Concentration (wt. %) | Alkaline compound | pH |
| 601 | 51 | Water:Methanol (80:20) | 0.2 | NaOH | 10.5 |
| 602 | 54 | Water:Methanol (80:20) | 0.2 | NaOH | 10.5 |
| 603 | 55 | Water:Methanol (80:20) | 0.3 | KOH | 10.0 |
| 604 | 56 | Water:Methanol (70:30) | 0.3 | $NH_4OH$ | 9.0 |
| 605 | 57 | Water:Methanol (80:20) | 0.3 | Monoethanolamine | 9.5 |
| 606 | 58 | Water:Methanol (80:20) | 0.3 | NaOH | 9.5 |
| 607 | 59 | Water:Methanol (80:20) | 0.3 | NaOH | 11.0 |
| 608 | 60 | Water:Methanol (80:20) | 0.3 | NaOH | 12.0 |
| 609 | 61 | Water:Methanol (90:10) | 0.3 | NaOH | 12.5 |
| 610 | 62 | Water:Methanol (90:10) | 0.3 | NaOH | 11.0 |
| 611 | 63 | Water:Methanol (80:20) | 0.3 | NaOH | 10.5 |
| 612 | 65 | Water:Methanol (80:20) | 0.3 | Triethanolamine | 10.0 |
| 613 | 64 | Water:Methanol (70:30) | 0.2 | NaOH | 11.0 |
| 614 | 66 | Water:Methanol (70:30) | 0.2 | Ethylenediamine | 11.0 |
| 615 | 67 | Water:Methanol (90:10) | 0.3 | NaOH | 10.5 |
| 616 | 68 | Water:Methanol (90:10) | 0.3 | NaOH | 10.0 |
| 617 | 69 | Water:Methanol (70:30) | 0.3 | Ethylenediamine | 10.0 |
| 618 | 70 | Water:Methanol (80:20) | 0.2 | Ethylenediamine | 11.0 |
| 619 | 71 | Water:Methanol (90:10) | 0.2 | $Na_2CO_3$ | 12.0 |
| 620 | 72 | Water:Methanol (90:10) | 0.2 | $NH_4OH$ | 12.0 |
| 621 | 73 | Water:Methanol (90:10) | 0.2 | NaOH | 10.0 |
| 622 | 74 | Water:Methanol (90:10) | 0.3 | NaOH | 10.0 |

Example 6 (Experiment Nos. 601 to 622)

In each experiment, polymerization was conducted using a stainless steel polymerization vessel with an inner capacity of 20 liters and having a stirrer, as described below.

First, a polymer scale preventive agent was prepared using a condensation product, a solvent and an alkaline compound given in Table 17 under conditions given in Table 17 (solvent composition, concentration and pH). The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

In the polymerization vessel in which the coating was formed as above, polymerization was carried out in the same manner as in Example 2. After the completion of the polymerization, the produced polymer was taken out and

TABLE 18

Results after 15th polymeirzation batch

| Exp. No. | Scale amount (g/m²) | | L value |
|---|---|---|---|
| | Liquid phase | Around interface of gas-liquid phases | |
| 601 | 0 | 7 | 85.6 |
| 602 | 0 | 10 | 85.6 |
| 603 | 0 | 16 | 85.6 |
| 604 | 0 | 11 | 85.6 |
| 605 | 0 | 12 | 85.6 |
| 606 | 0 | 9 | 85.5 |
| 607 | 0 | 8 | 85.6 |
| 608 | 0 | 11 | 85.6 |
| 609 | 0 | 13 | 85.5 |
| 610 | 0 | 10 | 85.6 |
| 611 | 0 | 9 | 85.6 |
| 612 | 0 | 12 | 84.7 |

TABLE 18-continued

Results after 15th polymeirzation batch

| Exp. No. | Scale amount (g/m²) | | L value |
|---|---|---|---|
| | Liquid phase | Around interface of gas-liquid phases | |
| 613 | 0 | 16 | 84.7 |
| 614 | 0 | 17 | 84.7 |
| 615 | 0 | 16 | 84.8 |
| 616 | 0 | 13 | 84.8 |
| 617 | 0 | 17 | 84.7 |
| 618 | 0 | 20 | 84.8 |
| 619 | 0 | 21 | 84.7 |
| 620 | 0 | 17 | 84.7 |
| 621 | 0 | 15 | 84.9 |
| 622 | 0 | 12 | 84.8 |

Production Example 4

Production of Condensation Product No.66

An autoclave was charged with 882 g of methanol, 4 g of 4-aminodiphenylamine as the aromatic amine compound (A-2) and 10 g of 4-aminosalycilic acid as the aromatic amine compound (A-1), and they were stirred, so that the 4-aminodiphenylamine and the 4-aminosalycilic acid were dissolved in the methanol.

The methanol solution thus obtained was added with 2 g of 1,4-naphthoquinone as the quinone compound (B), and the mixture obtained was heated to 40° C., subjected to reaction at 40° C. for 10 hours, and then added with 4 g of sodium hydrosulfite as the reaction stopper (C) dissolved in 98 g of water. The condensation conversion of the aromatic amine compounds and the quinone compound at the time when the reaction stopper (C) began to be added, was measured in accordance with the method below and found to be 97% by weight.

The solution to which the reaction stopper was added as mentioned above was stirred for another 10 hours and then cooled to give the solution of Condensation Product No.66.

—Measurement of condensation conversion

The unreacted aromatic amine compound (i.e., 4-aminodiphenylamine and 4-aminosalycilic acid in the production of Condensation Product No.66) and quinone compound (i.e., 1,4-naphthoquinone) in a reaction mixture is determined by liquid chromatography.

The condensation conversion is calculated by the equation:

*Condensation conversion (% by weight)* = $[(a-b)/a] \times 100$ wherein a stands for the total amount of the aromatic amine compounds and quinone compounds charged and b stands for the amount of the unreacted aromatic amine compounds and quinone compounds determined as above.

Production of Condensation Product Nos.67–82

In each production, the procedure of Production Condensation Product No.66 was repeated, except for using aromatic amine compounds (A-1) and (A-2) and a quinone compound (B) given in Table 19 and a solvent given in Table 20 under conditions given in Table 20 (total concentration, (A-1):(A-2):(B):(C) ratio, reaction temperature, elapsed time from the start of the condensation of the components (A) and (B) until the component began to be added (hereinafter referred to "elapsed time till addition of (C)"), condensation conversion of the components (A) and (B) at the time when the component (C) began to be added, stirring time after the addition of the components (C), and entire reaction time from the start of the condensation of the components (A) and (B) until the stirring after the addition of the component (C) was stopped (hereinafter referred to "entire reaction time")).

Production of Condensation Product Nos.83–111

In each production, the procedure of Production Condensation Product No.66 was repeated, except for using aromatic amine compounds (A-1) and (A-2), a quinone compound (B) and a reaction stopper (C) given in Table 21, 23 and 25 and a solvent given in Table 22, 24 and 26 under conditions given in Table 22, 24 and 26 (total concentration, (A-1):(A-2):(B):(C) ratio, reaction temperature, elapsed time till addition of (C), condensation conversion of the components (A) and (B) when the component (C) began to be added, stirring time after the addition of the components (C), and entire reaction time).

It is noted that the condensation products of Nos. 92–95 are those in which an aromatic amine compound (A-1) was only used as the component (A).

TABLE 19

| Condensation product No. | (A) Aromatic amine compound | | (B) Quinone compound | (C) Reaction stopper |
|---|---|---|---|---|
| | (A-1) | (A-2) | | |
| 66 | 4-Aminosalicylic acid | 4-Aminodiphenylamine | 1,4-Naphthoquinone | Sodium hydrosulfite |
| 67 | 2,3-Diaminobenzoic acid | 2-Aminodiphenylamine | 2-Hydroxy-1,4- | Sodium sulfide |
| 68 | 2,6-Diaminoterephthalic acid | 4,4'-Diaminodiphenylamine | p-Benzoquinone | Potassium sulfite |
| 69 | 4-Hydroxyanthranilic acid | 4-Aminodiphenylamine | p-Toluquinone | Sodium bisulfite |
| 70 | α-Naphthylamine-β-carboxylic acid | α-naphthylamine | p-Benzoquinone | Sodium hydrosulfite |
| 71 | 3,5-Diaminobenzoic acid | 2-Nitro-4-aminophenol | p-Benzoquinone | Rongalit |
| 72 | 4-Aminosalicylic acid | 1,8-Diaminonaphthalene | p-Benzoquinone | Sodium sulfide |
| 73 | 4-Aminoiso- | 4-Aminodiphenylamine | α- | Sodium hydro- |

TABLE 19-continued

| Condensation product No. | (A) Aromatic amine compound | | (B) Quinone compound | (C) Reaction stopper |
|---|---|---|---|---|
| | (A-1) | (A-2) | | |
| 74 | phthalic acid p-Aminobenzenesulfonic acid | p-Phenylenediamine | Naphthoquinone p-Benzoquinone | sulfite Sodium hydrosulfite |
| 75 | H-acid | 5-Nitro-2-aminophenol | p-Toluquinone | Phosphorus trichloride |
| 76 | J-acid | Aniline | p-Benzoquinone | Sodium hydrosulfite |
| 77 | p-Aminobenzenesulfonic acid | m-Phenylenediamine | p-Benzoquinone | Potassium sulfite |
| 78 | H-acid | α-Naphthylamine | Duroquinone | Hydrazine |
| 79 | J-acid | 2,3-Diaminonaphthalene | p-Benzoquinone | Rongalit |
| 80 | o-Aminobenzenesulfonic acid | 2-Aminodiphenylamine | Lawson | Rongalit |
| 81 | 2,4-Aminobenzenesulfonic acid | 1,8-Diaminonaphthalene | α-Naphthoquinone | Sodium hydrosulfite |
| 82 | 2,5-Aminobenzenesulfonic acid | p-Phenylenediamine | p-Benzoquinone | Sodium hydrosulfite |

TABLE 20

| Condensation product No. | Solvent (wt. ratio) | Total conc. of (A-1) + (A-2) + (B) + (C) (wt. %) | (A-1):(A-2):(B):(C) (wt. ratio) | Reaction temperature (°C.) | Elapsed time till addition of (C) (Hr) | Condensation conversion (%) | Entire reaction time (Hr) | Stirring time (Hr) |
|---|---|---|---|---|---|---|---|---|
| 66 | Methanol:Water (90:10) | 2.0 | 250:100:50:100 | 40 | 10 | 97 | 20 | 10 |
| 67 | Methanol:Water (90:10) | 1.0 | 500:100:100:200 | 100 | 10 | 97 | 15 | 5 |
| 68 | Methanol:Water (90:10) | 1.0 | 500:100:200:200 | 100 | 8 | 85 | 10 | 2 |
| 69 | Methanol:Water (90:10) | 0.5 | 500:100:50:100 | 150 | 8 | 95 | 10 | 2 |
| 70 | Methanol:Water (90:10) | 2.0 | 200:100:50:50 | 50 | 10 | 94 | 15 | 5 |
| 71 | Methanol:Water (60:40) | 3.0 | 100:50:150:30 | 60 | 10 | 95 | 15 | 5 |
| 72 | Methanol:Water (70:30) | 3.0 | 100:30:200:50 | 50 | 10 | 90 | 15 | 5 |
| 73 | Methanol:Water (70:30) | 3.0 | 100:30:200:50 | 50 | 10 | 87 | 15 | 5 |
| 74 | Methanol:Water (80:20) | 2.0 | 200:100:100:100 | 50 | 10 | 87 | 20 | 10 |
| 75 | Methanol:Water (80:20) | 1.0 | 100:100:50:50 | 50 | 10 | 88 | 15 | 5 |
| 76 | Methanol:Water (80:20) | 5.0 | 100:50:30:50 | 100 | 8 | 82 | 10 | 2 |
| 77 | Methanol:Water (80:20) | 2.0 | 200:100:50:100 | 150 | 8 | 97 | 20 | 12 |
| 78 | Methanol:Water (50:50) | 2.0 | 150:100:50:30 | 50 | 30 | 86 | 40 | 10 |
| 79 | Methanol:Water (70:30) | 2.0 | 50:100:50:50 | 30 | 10 | 96 | 20 | 10 |
| 80 | Methanol:Water (60:40) | 3.0 | 100:50:200:50 | 70 | 10 | 96 | 20 | 10 |
| 81 | Methanol:Water (60:40) | 3.0 | 100:50:100:30 | 50 | 10 | 92 | 20 | 10 |
| 82 | Methanol:Water (60:40) | 3.0 | 100:20:100:30 | 50 | 10 | 95 | 20 | 10 |

TABLE 21

| Condensation product No. | (A) Aromatic amine compound | | (B) Quinone compound | (C) Reaction stopper |
|---|---|---|---|---|
| | (A-1) | (A-2) | | |
| 83 | p-Aminophenol | 4-Aminodiphenylamine | p-Benzoquinone | Pyrogallol |
| 84 | p-Aminophenol | 1,8-Diaminonaphthalene | o-Benzoquinone | Phenol |
| 85 | 4-Amino-2-aminophenol | m-Phenylenediamine | p-Benzoquinone | Catechol |
| 86 | 2-Nitro-4-aminophenol | 2,3-Diaminotoluene | α-Naphthoquinone | β-Naphthol |
| 87 | m-Aminophenol | p-Phenylenediamine | α-Naphthoquinone | Resorcinol |
| 88 | p-Aminosalicylic acid | 4-Aminodiphenylamine | p-Benzoquinone | Pyrogallol |
| 89 | p-Aminophenol | 1,8-Diaminonaphthalene | Duroquinone | Hydroxybenzoic acid |
| 90 | p-Aminobenzoic acid | 4-Aminodiphenylamine | α-Naphthoquinone | Hydroquinone |
| 91 | p-Aminophenol | 4-4'-Diaminodiphenylamine | Juglone | α-Naphthol |
| 92 | p-Aminosalicylic acid | — | Lawson | 2,7-Dihydroxynaphthalene |
| 93 | m-Aminophenol | — | p-Benzoquinone | Pyrogallol |
| 94 | p-Aminophenol | — | α-Naphthoquinone | Hydroxyhydroquinone |
| 95 | o-Aminophenol | — | o-Benzoquinone | Resorcinol |

TABLE 22

| Condensation product No. | Solvent (wt. ratio) | Total conc. of (A-1) + (A-2) + (B) + (C) (wt. %) | (A-1):(A-2):(B):(C) (wt. ratio) | Reaction temperature (°C.) | Elapsed time till addition of (C) (Hr) | Condensation conversion (%) | Entire reaction time (Hr) | Stirring time (Hr) |
|---|---|---|---|---|---|---|---|---|
| 83 | Methanol | 2.0 | 100:50:20:30 | 40 | 10 | 92 | 50 | 40 |
| 84 | Methanol | 2.0 | 100:50:20:100 | 50 | 5 | 90 | 50 | 45 |
| 85 | Methanol:Water (80:20) | 2.5 | 100:100:10:100 | 30 | 10 | 93 | 50 | 40 |
| 86 | Methanol | 1.5 | 100:200:20:200 | 60 | 20 | 78 | 50 | 30 |
| 87 | Methanol | 1.5 | 100:50:50:50 | 100 | 10 | 89 | 50 | 40 |
| 88 | Methanol | 1.5 | 100:100:50:50 | 80 | 5 | 79 | 50 | 45 |
| 89 | Methanol | 1.0 | 100:150:10:100 | 30 | 3 | 82 | 50 | 47 |
| 90 | Methanol | 1.0 | 100:100:10:100 | 30 | 5 | 78 | 50 | 45 |
| 91 | Methanol | 1.0 | 100:100:20:50 | 30 | 10 | 80 | 50 | 40 |
| 92 | Methanol | 1.5 | 100:—:20:50 | 60 | 10 | 87 | 50 | 40 |
| 93 | Methanol | 2.0 | 100:—:20:50 | 60 | 5 | 95 | 50 | 45 |
| 94 | Methanol | 1.0 | 100:—:50:50 | 50 | 5 | 94 | 50 | 45 |
| 95 | Methanol | 2.0 | 100:—:20:100 | 40 | 5 | 90 | 50 | 45 |

TABLE 23

| Condensation product No. | (A) Aromatic amine compound | | (B) Quinone compound | (C) Reaction stopper |
|---|---|---|---|---|
| | (A-1) | (A-2) | | |
| 96 | p-Aminophenol | 4-Aminodiphenylamine | p-Benzoquinone | Sodium hydrosulfite |
| 97 | 4-Amino-2-aminophenol | m-Phenylenediamine | α-Naphthoquinone | Sodium tiosulfate |
| 98 | m-Aminophenol | 2-Aminodiphenylamine | p-Benzoquinone | Sodium sulfide |
| 99 | 1-Amino-5-hydroxynaphtha- | p-Phenylenediamine | p-Benzoquinone | Sodium tiosulfate |

TABLE 23-continued

| Condensation product No. | (A) Aromatic amine compound | | (B) Quinone compound | (C) Reaction stopper |
|---|---|---|---|---|
| | (A-1) | (A-2) | | |
| 100 | lene<br>m-Aminophenol | 2-Aminodiphenyl-amine | Duroquinone | Rongalit |
| 101 | 2,4-Diamino-benzenesulfonic acid | 4-Aminodiphenyl-amine | α-Naphthoquinone | Rongalit |
| 102 | 3,5-Diamino-benzoic acid | 1,8-Diamino-naphthalene | p-Benzoquinone | Ammonium sulfide |

TABLE 24

| Condensation product No. | Solvent (wt. ratio) | Total conc. of (A-1) + (A-2) + (B) + (C) (wt. %) | (A-1):(A-2):(B):(C) (wt. ratio) | Reaction temperature (°C.) | Elapsed time till addition of (C) (Hr) | Condensation conversion (%) | Entire reaction time (Hr) | Stirring time (Hr) |
|---|---|---|---|---|---|---|---|---|
| 96 | Methanol:Water (90:10) | 2.0 | 100:50:30:20 | 30 | 8 | 78 | 30 | 22 |
| 97 | Methanol:Water (90:10) | 2.0 | 100:100:50:100 | 50 | 5 | 83 | 30 | 25 |
| 98 | Methanol/Water (90:10) | 1.0 | 100:30:30:10 | 30 | 20 | 84 | 30 | 10 |
| 99 | Methanol:Water (90:10) | 1.0 | 100:20:10:30 | 50 | 25 | 96 | 30 | 5 |
| 100 | Methanol:Water (80:20) | 2.0 | 100:100:100:100 | 25 | 8 | 75 | 30 | 22 |
| 101 | Methanol:Water (60:40) | 3.0 | 100:50:30:200 | 50 | 10 | 87 | 15 | 5 |
| 102 | Methanol:Water (60:40) | 3.0 | 100:50:50:100 | 50 | 10 | 89 | 15 | 5 |

TABLE 25

| Condensation product No. | (A) Aromatic amine compound | | (B) Quinone compound | (C) Natural aromatic hydroxyl-containing organic compound |
|---|---|---|---|---|
| | (A-1) | (A-2) | | |
| 103 | p-Aminophenol | 4-Aminodiphenyl-amine | p-Benzoquinone | Mimosa tannin |
| 104 | m-Aminophenol | 1,8-Diamino-naphthalene | 1,4-Naphthoquinone | Lignin |
| 105 | p-Aminobenzoic acid | o-Phenylenediamine | Duroquinone | Tara tanin |
| 106 | p-Amino-salicylic acid | 1,8-Diamino-naphthalene | p-Benzoquinone | Mangrove tannin |
| 107 | p-Aminosulfonic acid | 4-Aminodiphenyl-amine | 1,4-Naphthoquinone | Lignin |
| 108 | p-Aminophenol | m-Phenylenediamine | 2-Hydroxy-1,4-naphthoquinone | Mimosa tannin |
| 109 | p-Aminophenol | 1,8-Diamino-naphthalene | p-Benzoquinone | Tannin of persimmon |
| 110 | 3,5-Diaminobenzoic acid | 4-Aminodiphenyl-amine | α-Naphthoquinone | Chinese gallotannin |
| 111 | 2,5-Diaminobenzenesulfonic acid | m-Phenylenediamine | p-Benzoquinone | Myrobalan tannin |

TABLE 26

| Condensation product No. | Solvent (wt. ratio) | Total conc. of (A-1) + (A-2) + (B) + (C) (wt. %) | (A-1):(A-2):(B):(C) (wt. ratio) | Reaction temperature (°C.) | Elapsed time till addition of (C) (Hr) | Condensation conversion (%) | Entire reaction time (Hr) | Stirring time (Hr) |
|---|---|---|---|---|---|---|---|---|
| 103 | Methanol:Water (70:30) | 2.5 | 100:20:30:10 | 40 | 20 | 93 | 50 | 30 |
| 104 | Methanol:Water (80:20) | 1.0 | 100 10:50:200 | 20 | 20 | 94 | 50 | 30 |
| 105 | Methanol:Water (90:10) | 2.0 | 100:50:10:100 | 50 | 30 | 92 | 50 | 20 |
| 106 | Methanol:Water (90:10) | 1.5 | 100:50:10:50 | 50 | 45 | 98 | 50 | 5 |
| 107 | Methanol:Water (90:10) | 1.5 | 100:10:50:50 | 50 | 10 | 95 | 50 | 40 |
| 108 | Methanol:Water (70:30) | 2.0 | 100:20:50:50 | 40 | 10 | 91 | 50 | 40 |
| 109 | Methanol:Water (70:30) | 2.0 | 100:20:50:50 | 40 | 10 | 93 | 50 | 40 |
| 110 | Methanol:Water (70:30) | 3.0 | 100:20:200:100 | 40 | 10 | 88 | 15 | 5 |
| 111 | Methanol:Water (70:30) | 3.0 | 100:40:200:100 | 40 | 15 | 94 | 20 | 5 |

Example 7 (Experiment Nos. 701 to 746)

In each experiment, polymerization was conducted using a stainless steel polymerization vessel with an inner capacity of 1,000 liters and having a stirrer, as described below.

First, a polymer scale preventive agent was prepared using a condensation product, a solvent and an alkaline compound given in Table 27 and 28 under conditions given in Table 27 and 28 (solvent composition, concentration and pH). The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

In the polymerization vessel in which the coating was formed as above, polymerization was carried out in the same manner as in Example 1. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 100 times. After the 100th batch, the amount of polymer scale on an area located in the liquid phase during polymerization and on an area in the vicinity of the interface between the gas and liquid phases, was measured in the same manner as in Example 1.

The number of fish eyes which may appear when a polymer is formed into sheet was measured with respect to the polymers produced in the experiments in the same manner as in Example 1.

Further, to evaluate initial coloration at the time a polymer is formed into sheet, luminosity index L was measured in the same manner as in Example 1.

The results are given in Table 29 and 30.

TABLE 27

| Exp. No. | Condensation product No. | Solvent (wt. ratio) | Concentration (wt. %) | Alkaline compound | pH |
|---|---|---|---|---|---|
| 701 | 66 | Water:Methanol (90:10) | 0.3 | NaOH | 9.0 |
| 702 | 67 | Water:Methanol (80:20) | 0.5 | NaOH | 9.5 |
| 703 | 68 | Water:Methanol (80:20) | 0.1 | KOH | 10.0 |
| 704 | 69 | Water:Methanol (80:20) | 0.05 | KOH | 10.0 |
| 705 | 70 | Water:Methanol (90:10) | 0.2 | NaOH | 9.0 |
| 706 | 71 | Water:Methanol (80:20) | 0.3 | NaOH | 9.0 |
| 707 | 72 | Water:Methanol (80:20) | 0.3 | Ethylenediamine | 9.5 |
| 708 | 73 | Water:Methanol (80:20) | 0.3 | KOH | 9.0 |
| 709 | 74 | Water:Methanol (90:10) | 0.3 | NaOH | 8.5 |
| 710 | 75 | Water:Methanol (90:10) | 0.3 | NaOH | 9.0 |
| 711 | 76 | Water:Methanol (80:20) | 0.5 | Ethylenediamine | 9.0 |
| 712 | 77 | Water:Methanol (80:20) | 0.2 | Triethanolamine | 10.0 |
| 713 | 78 | Water:Methanol (70:30) | 0.2 | NaOH | 11.0 |
| 714 | 79 | Water:Methanol (60:40) | 0.2 | NaOH | 12.0 |
| 715 | 80 | Water:Methanol (80:20) | 0.3 | NaOH | 9.5 |
| 716 | 81 | Water:Methanol (80:20) | 0.3 | KOH | 9.5 |
| 717 | 82 | Water:Methanol (80:20) | 0.3 | Ethylenediamine | 9.5 |
| 718 | 83 | Water:Methanol (70:30) | 0.3 | Triethanolamine | 8.5 |
| 719 | 84 | Water:Methanol (80:20) | 0.3 | NaOH | 9.0 |
| 720 | 85 | Water:Methanol (80:20) | 0.3 | Ethylenediamine | 9.5 |
| 721 | 86 | Water:Methanol (80:20) | 0.2 | KOH | 10.0 |
| 722 | 87 | Water:Methanol (80:20) | 0.1 | KOH | 10.0 |
| 723 | 88 | Water:Methanol (80:20) | 0.3 | KOH | 10.0 |

TABLE 28

| Exp. No. | Condensation product No. | Solvent (wt. ratio) | Concentration (wt. %) | Alkaline compound | pH |
|---|---|---|---|---|---|
| 724 | 89 | Water:Methanol (70:30) | 0.3 | Ethylenediamine | 11.0 |
| 725 | 90 | Water:Methanol (90:10) | 0.3 | NaOH | 11.0 |
| 726 | 91 | Water:Methanol (60:40) | 0.3 | NaOH | 11.5 |
| 727 | 92 | Water:Methanol (50:50) | 0.3 | NaOH | 12.0 |
| 728 | 93 | Water:Methanol (70:30) | 0.2 | NaOH | 12.0 |
| 729 | 94 | Water:Methanol (70:30) | 0.2 | Triethanolamine | 9.0 |
| 730 | 95 | Water:Methanol (70:30) | 0.3 | Triethanolamine | 9.0 |
| 731 | 96 | Water:Methanol (80:20) | 0.2 | Ethylenediamine | 10.0 |
| 732 | 97 | Water:Methanol (80:20) | 0.2 | Ethylenediamine | 10.0 |
| 733 | 98 | Water:Methanol (70:30) | 0.3 | Ethylenediamine | 9.0 |
| 734 | 99 | Water:Methanol (70:30) | 0.2 | NaOH | 9.0 |
| 735 | 100 | Water:Methanol (80:20) | 0.2 | NaOH | 10.0 |
| 736 | 101 | Water:Methanol (90:10) | 0.3 | NaOH | 9.0 |
| 737 | 102 | Water:Methanol (90:10) | 0.3 | Ethylenediamine | 9.5 |
| 738 | 103 | Water:Methanol (80:20) | 0.3 | NaOH | 9.5 |
| 739 | 104 | Water:Methanol (80:20) | 0.3 | NaOH | 11.5 |
| 740 | 105 | Water:Methanol (90:10) | 0.2 | Triethanolamine | 10.0 |
| 741 | 106 | Water:Methanol (80:20) | 0.2 | Ethylenediamine | 9.0 |
| 742 | 107 | Water:Methanol (70:30) | 0.2 | Monoethanolamine | 8.0 |
| 743 | 108 | Water:Methanol (80:20) | 0.3 | NaOH | 9.5 |
| 744 | 109 | Water:Methanol (80:20) | 0.3 | NaOH | 9.5 |
| 745 | 110 | Water:Methanol (90:10) | 0.3 | NaOH | 10.0 |
| 746 | 111 | Water:Methanol (80:20) | 0.3 | NaOH | 9.5 |

TABLE 29

Results after 100th polymerization batch

| Exp. No. | Scale amount (g/m²) | | No. of fish eyes | L value |
|---|---|---|---|---|
| | Liquid phase | Around interface of gas-liquid phases | | |
| 701 | 0 | 21 | 7 | 72.7 |
| 702 | 0 | 25 | 8 | 72.7 |
| 703 | 0 | 24 | 7 | 72.7 |
| 704 | 1 | 32 | 9 | 72.6 |
| 705 | 0 | 28 | 8 | 72.6 |
| 706 | 0 | 17 | 7 | 72.7 |
| 707 | 0 | 20 | 8 | 72.7 |
| 708 | 0 | 16 | 7 | 72.7 |
| 709 | 0 | 21 | 7 | 72.6 |
| 170 | 0 | 26 | 8 | 72.7 |
| 711 | 0 | 26 | 7 | 72.5 |
| 712 | 0 | 27 | 8 | 72.7 |
| 713 | 0 | 25 | 8 | 72.7 |
| 714 | 0 | 20 | 7 | 72.7 |
| 715 | 0 | 22 | 8 | 72.7 |
| 716 | 0 | 21 | 8 | 72.7 |
| 717 | 0 | 18 | 8 | 72.7 |
| 718 | 0 | 24 | 7 | 72.7 |
| 719 | 0 | 26 | 8 | 72.6 |
| 720 | 0 | 24 | 7 | 72.6 |
| 721 | 0 | 23 | 7 | 72.5 |
| 722 | 0 | 28 | 8 | 72.5 |
| 723 | 0 | 25 | 8 | 72.7 |

TABLE 30

Results after 100th polymerization batch

| Exp. No. | Scale amount (g/m²) | | No. of fish eyes | L value |
|---|---|---|---|---|
| | Liquid phase | Around interface of gas-liquid phases | | |
| 724 | 0 | 23 | 7 | 72.6 |
| 725 | 0 | 21 | 7 | 72.6 |
| 726 | 0 | 27 | 8 | 72.5 |
| 727 | 0 | 62 | 24 | 72.5 |
| 728 | 0 | 73 | 24 | 72.5 |
| 729 | 0 | 81 | 26 | 72.5 |
| 730 | 0 | 75 | 25 | 72.5 |
| 731 | 0 | 20 | 7 | 72.7 |
| 732 | 0 | 22 | 8 | 72.5 |
| 733 | 0 | 20 | 7 | 72.5 |
| 734 | 0 | 21 | 7 | 72.6 |
| 735 | 0 | 28 | 8 | 72.5 |
| 736 | 0 | 17 | 7 | 72.6 |
| 737 | 0 | 20 | 8 | 72.7 |
| 738 | 0 | 18 | 7 | 72.7 |
| 739 | 0 | 25 | 8 | 72.6 |
| 740 | 0 | 27 | 9 | 72.6 |
| 741 | 0 | 20 | 7 | 72.6 |
| 742 | 0 | 26 | 8 | 72.6 |
| 743 | 0 | 30 | 9 | 72.5 |
| 744 | 0 | 28 | 9 | 72.5 |
| 745 | 0 | 16 | 7 | 72.6 |
| 746 | 0 | 18 | 8 | 72.6 |

Example 8 (Experiment Nos. 801 to 844)

In each experiment, polymerization was conducted using a stainless steel polymerization vessel with an inner capacity of 20 liters and having a stirrer, as described below.

First, a polymer scale preventive agent was prepared using a condensation product, a solvent and an alkaline compound given in Table 31 and 32 under conditions given in Table 31 and 32 (solvent composition, concentration and pH). The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

In the polymerization vessel in which the coating was formed as above, polymerization was carried out in the same manner as in Example 2. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 50 times. After the 50th batch, the amount of polymer scale on an area located in the liquid phase during polymerization and on an area in the vicinity of the interface between the gas and liquid phases, was measured in the same manner as in Example 1.

Further, to evaluate initial coloration at the time a polymer is formed into sheet, luminosity index L was measured in the same manner as in Example 2.

The results are given in Table 33 and 34.

TABLE 31

Polymer scale preventive agent

| Exp. No. | Condensation product No. | Solvent (wt. ratio) | Concentration (wt. %) | Alkaline compound | pH |
|---|---|---|---|---|---|
| 801 | 66 | Water:Methanol (80:20) | 0.3 | NaOH | 9.0 |
| 802 | 67 | Water:Methanol (70:30) | 0.2 | NaOH | 9.5 |
| 803 | 68 | Water:Methanol (60:40) | 0.2 | NaOH | 9.5 |
| 804 | 69 | Water:Methanol (50:50) | 0.2 | NaOH | 10.0 |
| 805 | 70 | Water:Methanol (80:20) | 0.3 | NaOH | 10.0 |
| 806 | 71 | Water:Methanol (90:10) | 0.3 | NaOH | 9.5 |
| 807 | 72 | Water:Methanol (90:10) | 0.3 | NaOH | 9.5 |
| 808 | 73 | Water:Methanol (80:20) | 0.3 | NaOH | 10.0 |
| 809 | 74 | Water:Methanol (70:30) | 0.3 | NaOH | 9.0 |
| 810 | 75 | Water:Methanol (80:20) | 0.3 | NaOH | 9.0 |

TABLE 31-continued

| | | Polymer scale preventive agent | | | |
|---|---|---|---|---|---|
| Exp. No. | Condensation product No. | Solvent (wt. ratio) | Concentration (wt. %) | Alkaline compound | pH |
| 811 | 76 | Water:Methanol (80:20) | 0.2 | Ethylenediamine | 10.5 |
| 812 | 77 | Water:Methanol (80:20) | 0.2 | Triethanolamine | 10.5 |
| 813 | 78 | Water:Methanol (90:10) | 0.3 | NaOH | 10.5 |
| 814 | 79 | Water:Methanol (90:10) | 0.3 | NaOH | 11.0 |
| 815 | 80 | Water:Methanol (90:10) | 0.3 | NaOH | 9.5 |
| 816 | 81 | Water:Methanol (90:10) | 0.3 | NaOH | 11.0 |
| 817 | 82 | Water:Methanol (80:20) | 0.3 | NaOH | 11.0 |
| 818 | 83 | Water:Methanol (70:30) | 0.2 | Triethanolamine | 10.0 |
| 819 | 84 | Water:Methanol (70:30) | 0.2 | NaOH | 11.5 |
| 820 | 85 | Water:Methanol (80:20) | 0.3 | KOH | 11.0 |
| 821 | 86 | Water:Methanol (80:20) | 0.3 | NaOH | 8.5 |
| 822 | 87 | Water:Methanol (50:50) | 0.3 | Diethanolamine | 8.0 |

TABLE 32

| | | Polymer scale preventive agent | | | |
|---|---|---|---|---|---|
| Exp. No. | Condensation product No. | Solvent (wt. ratio) | Concentration (wt. %) | Alkaline compound | pH |
| 823 | 88 | Water:Methanol (30:70) | 0.5 | Diethanolamine | 12.0 |
| 824 | 89 | Water:Methanol (50:50) | 0.2 | Diethanolamine | 8.5 |
| 825 | 90 | Water:Methanol (80:20) | 0.1 | Ethylenediamine | 10.0 |
| 826 | 92 | Water:Methanol (80:20) | 0.2 | KOH | 10.0 |
| 827 | 93 | Water:Methanol (80:20) | 0.2 | Triethanolamine | 11.0 |
| 828 | 94 | Water:Methanol (70:30) | 0.2 | Ethylenediamine | 11.0 |
| 829 | 95 | Water:Methanol (70:30) | 0.2 | NaOH | 9.5 |
| 830 | 96 | Water:Methanol (80:20) | 0.3 | NaOH | 9.5 |
| 831 | 97 | Water:Methanol (80:20) | 0.3 | KOH | 9.5 |
| 832 | 98 | Water:Methanol (70:30) | 0.2 | NaOH | 12.0 |
| 833 | 99 | Water:Methanol (70:30) | 0.2 | Monoethanolamine | 12.0 |
| 834 | 101 | Water:Methanol (80:20) | 0.3 | NaOH | 11.0 |
| 835 | 102 | Water:Methanol (80:20) | 0.3 | NaOH | 10.5 |
| 836 | 103 | Water:Methanol (80:20) | 0.3 | NaOH | 10.0 |
| 837 | 104 | Water:Methanol (70:30) | 0.2 | NaOH | 9.0 |
| 838 | 105 | Water:Methanol (70:30) | 0.2 | NaOH | 8.5 |
| 839 | 106 | Water:Methanol (90:10) | 0.3 | Ethylenediamine | 10.0 |
| 840 | 107 | Water:Methanol (90:10) | 0.3 | Ethylenediamine | 11.0 |
| 841 | 108 | Water:Methanol (80:20) | 0.3 | NaOH | 10.5 |
| 842 | 109 | Water:Methanol (80:20) | 0.3 | NaOH | 10.0 |
| 843 | 110 | Water:Methanol (90:10) | 0.3 | NaOH | 9.5 |
| 844 | 111 | Water:Methanol (90:10) | 0.3 | NaOH | 10.0 |

TABLE 33

| | Results after 50th polymeirzation batch | | |
|---|---|---|---|
| | Scale amount (g/m$^2$) | | |
| Exp. No. | Liquid phase | Around interface of gas-liquid phases | L value |
| 801 | 0 | 27 | 85.6 |
| 802 | 0 | 30 | 85.6 |
| 803 | 0 | 35 | 85.6 |
| 804 | 0 | 31 | 85.5 |
| 805 | 0 | 31 | 85.6 |
| 806 | 0 | 24 | 85.6 |
| 807 | 0 | 27 | 85.6 |
| 808 | 0 | 20 | 85.6 |
| 809 | 0 | 26 | 85.6 |
| 810 | 0 | 29 | 85.6 |
| 811 | 0 | 25 | 85.6 |
| 812 | 0 | 27 | 85.6 |
| 813 | 0 | 26 | 85.6 |
| 814 | 0 | 28 | 85.6 |
| 815 | 0 | 26 | 85.6 |
| 816 | 0 | 24 | 85.6 |
| 817 | 0 | 21 | 85.6 |
| 818 | 0 | 21 | 85.6 |
| 819 | 1 | 32 | 85.6 |
| 820 | 2 | 40 | 85.6 |
| 821 | 3 | 48 | 85.7 |
| 822 | 1 | 28 | 85.6 |

TABLE 34

Results after 50th polymeirzation batch

| Exp. No. | Scale amount (g/m$^2$) Liquid phase | Around interface of gas-liquid phases | L value |
|---|---|---|---|
| 823 | 0 | 22 | 85.2 |
| 824 | 0 | 25 | 85.7 |
| 825 | 3 | 43 | 85.6 |
| 826 | 8 | 78 | 85.6 |
| 827 | 6 | 65 | 85.6 |
| 828 | 8 | 76 | 85.6 |
| 829 | 7 | 71 | 85.4 |
| 830 | 0 | 21 | 85.6 |
| 831 | 1 | 30 | 85.6 |
| 832 | 1 | 24 | 85.6 |
| 833 | 1 | 26 | 85.5 |
| 834 | 0 | 17 | 85.6 |
| 835 | 0 | 15 | 85.6 |
| 836 | 0 | 18 | 85.6 |
| 837 | 0 | 21 | 85.6 |
| 838 | 0 | 22 | 85.6 |
| 839 | 0 | 20 | 85.6 |
| 840 | 0 | 23 | 85.6 |
| 841 | 1 | 41 | 85.5 |
| 842 | 1 | 36 | 85.5 |
| 843 | 0 | 16 | 85.6 |
| 844 | 0 | 15 | 85.6 | wall, the stirring shaft, the stirring blades and other areas with which a monomer comes into contact of the polymerization vessel. The applied polymer scale preventive agent was dried by heating at 40° C. for 15 minutes to form a coating, which was then washed with water.

In the polymerization vessel in which the coating was formed as above, polymerization was carried out in the same manner as in Example 1. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 100 times. After the 100th batch, the amount of polymer scale on an area located in the liquid phase during polymerization and on an area in the vicinity of the interface between the gas and liquid phases, was measured in the same manner as in Example 1.

The number of fish eyes which may appear when a polymer is formed into sheet was measured with respect to the polymers produced in the experiments in the same manner as in Example 1.

Further, to evaluate initial coloration at the time a polymer is formed into sheet, luminosity index L was measured in the same manner as in Example 1.

The results are given in Table 37 and 38.

TABLE 35

Polymer scale preventive agent

| Exp. No. | (F) Condensation Product No. | (D) Water-Soluble polymeric compound | (E) Colloidal silica and/or alkali metal silicate | Solvent (weight ratio) | Total concentratoin of (F) + (D) + (E) (wt. %) | (F):(D):(E): (weight ratio) | Alkaline compound (pH) |
|---|---|---|---|---|---|---|---|
| 901 | 44 | — | — | Water:Methanol (90:10) | 0.2 | — | NaOH (9.5) |
| 902 | 54 | — | — | Water:Methanol (90:10) | 0.2 | — | NaOH (9.5) |
| 903 | 60 | — | — | Water:Methanol (90:10) | 0.2 | — | KOH (10.0) |
| 904 | 64 | — | — | Water:Methanol (80:20) | 0.3 | — | KOH (10.0) |
| 905 | 56 | — | — | Water:Methanol (90:10) | 0.3 | — | NaOH (11.0) |
| 906 | 58 | — | — | Water:Methanol (90:10) | 0.3 | — | NaOH (11.0) |
| 907 | 20 | Polyvinyl pyrrolidone | a | Water:Methanol (90:10) | 0.3 | 100:50:100 | NaOH (9.5) |
| 908 | 23 | Gelatin | c | Water:Methanol (90:10) | 0.3 | 100:100:100 | NaOH (9.5) |
| 909 | 28 | Polyvinyl alcohol | b | Water:Methanol (90:10) | 0.3 | 100:50:100 | KOH (9.5) |
| 910 | 31 | Pectin | a | Water:Methanol (90:10) | 0.3 | 100:200:100 | KOH (9.5) |
| 911 | 32 | Polyacrylate | b | Water:Methanol (90:10) | 0.3 | 100:100:200 | KOH (10.5) |
| 912 | 33 | Polyvinyl pyrrolidone | c | Water:Methanol (90:10) | 0.3 | 100:30:100 | KOH (10.5) |

Example 9 (Experiment Nos. 901 to 923)

In each experiment, polymerization was conducted using a stainless steel polymerization vessel with an inner capacity of 1,000 liters and having a stirrer, as described below.

First, a polymer scale preventive agent was prepared using a condensation product (F), a water-soluble polymeric compound (D), a colloidal silica and/or an alkali metal silicate (E), a solvent and an alkaline compound given in Tables 35 and 36 under conditions given in Tables 35 and 36 (solvent composition, total concentration, (F):(D):(E) ratio and pH). The colloidal silicas used in this Example and Examples 10 to 12 below (a to g indicated in Tables 35, 36, 40–42, 46, 47 and 50–52) are shown in Table 39. The polymer scale preventive agent was applied to the inner

TABLE 36

| Exp. No. | (F) Condensation Product No. | (D) Water-Soluble polymeric compound | (E) Colloidal silica and/or alkali metal silicate | Solvent (weight ratio) | Total concentration of (F) + (D) + (E) (wt. %) | (F):(D):(E): (weight ratio) | Alkaline compound (pH) |
|---|---|---|---|---|---|---|---|
| 913 | 46 | Gelatin | a | Water:Methanol (90:10) | 0.3 | 100:50:100 | KOH (9.5) |
| 914 | 47 | Gelatin | b | Water:Methanol (90:10) | 0.3 | 100:50:200 | NaOH (9.5) |
| 915 | 50 | Gelatin | b | Water:Methanol (90:10) | 0.3 | 100:100:100 | NaOH (9.5) |
| 916 | 52 | Pectin | c | Water:Methanol (90:10) | 0.3 | 100:100:300 | NaOH (10.0) |
| 917 | 54 | Casein | c | Water:Methanol (90:10) | 0.3 | 100:50:300 | NaOH (11.0) |
| 918 | 62 | Polyvinyl pyrrolidone | a | Water:Methanol (80:20) | 0.3 | 100:100:100 | KOH (11.0) |
| 919 | 64 | Polyvinyl alcohol | a | Water:Methanol (80:20) | 0.3 | 100:50:200 | KOH (12.0) |
| 920 | 57 | Gelatin | b | Water:Methanol (80:20) | 0.3 | 100:20:100 | KOH (12.0) |
| 921 | 58 | Gelatin | f | Water:Methanol (80:20) | 0.3 | 100:20:50 | KOH (11.0) |
| 922 | 59 | Gelatin | c | Water:Methanol (80:20) | 0.3 | 100:50:200 | KOH (11.0) |
| 923 | 41 | Gelatin | a | Water:Methanol (90:10) | 0.3 | 100:50:100 | KOH (9.5) |

TABLE 37

Results after 100th polymerization batch

| Exp. No. | Scale amount (g/m$^2$) Liquid phase | Around interface of gas-liquid phases | Number of fish eyes | L value |
|---|---|---|---|---|
| 901 | 0 | 235 | 26 | 71.9 |
| 902 | 0 | 245 | 27 | 71.8 |
| 903 | 0 | 220 | 26 | 71.2 |
| 904 | 0 | 215 | 24 | 71.1 |
| 905 | 0 | 220 | 25 | 71.2 |
| 906 | 0 | 210 | 24 | 71.2 |
| 907 | 0 | 38 | 8 | 72.5 |
| 908 | 0 | 54 | 10 | 72.5 |
| 909 | 0 | 42 | 8 | 72.5 |
| 910 | 0 | 55 | 10 | 72.4 |
| 911 | 0 | 41 | 8 | 72.4 |
| 912 | 0 | 47 | 9 | 72.4 |

TABLE 38

Results after 100th polymerization batch

| Exp. No. | Scale amount (g/m$^2$) Liquid phase | Around interface of gas-liquid phases | Number of fish eyes | L value |
|---|---|---|---|---|
| 913 | 0 | 2 | 4 | 72.6 |
| 914 | 0 | 2 | 5 | 72.6 |
| 925 | 0 | 3 | 4 | 72.6 |
| 916 | 0 | 2 | 4 | 72.6 |
| 917 | 0 | 4 | 5 | 72.6 |
| 918 | 0 | 2 | 4 | 71.9 |
| 919 | 0 | 2 | 4 | 71.8 |
| 920 | 0 | 3 | 4 | 71.9 |
| 921 | 0 | 4 | 5 | 71.9 |
| 922 | 0 | 3 | 4 | 71.9 |
| 923 | 0 | 45 | 9 | 72.5 |

TABLE 39

| Colloidal silica | Particle diameter of colloid particles | Remarks*[1] |
|---|---|---|
| a | 5–7 μm | Snowtex CXS-9*[2] |
| b | 7–9 μm | Snowtex S*[2] |
| c | 10–20 μm | Snowtex O*[2] |
| d | 10–20 μm | Methanol silica sol |
| e | 10–20 μm | Ethylene glycol silica sol |
| f | 10–20 μm | Snowtex N*[2] |
| g | 10–20 μm | Snowtex C*[2] |

*[1] All the products are produced by Nissan Chemical Industries, Ltd.
*[2] Tradenames Example 10 (Experiment Nos. 1001 to 1040)

In each experiment, a polymer scale preventive agent was prepared using a condensation product (F), a water-soluble polymeric compound (D), a colloidal silica and/or an alkali metal silicate (E), a solvent and an alkaline compound given in Tables 40–42 under conditions given in Tables 40–42 (solvent composition, total concentration, (F):(D):(E) ratio and pH). The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

In the polymerization vessel in which the coating was formed as above, polymerization was carried out in the same manner as in Example 1. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 150 times. After the 150th batch, the amount of polymer scale on an area located in the liquid phase during polymerization and on an area in the vicinity of the interface between the gas and liquid phases, was measured in the same manner as in Example 1.

The number of fish eyes which may appear when a polymer is formed into sheet was measured with respect to the polymers produced in the experiments in the same manner as in Example 1.

Further, to evaluate initial coloration at the time a polymer is formed into sheet, luminosity index L was measured in the same manner as in Example 1.

The results are given in Table 43–45.

TABLE 40

| | | | | | | | |
|---|---|---|---|---|---|---|---|
| | | | Polymer scale preventive agent | | | | |
| Exp. No. | (F) Condensation Product No. | (D) Water-Soluble polymeric compound | (E) Colloidal silica and/or alkali metal silicate | Solvent (weight ratio) | Total concentratoin of (F) + (D) + (E) (wt. %) | (F):(D):(E): (weight ratio) | Alkaline compound (pH) |
| 1001 | 83 | — | — | Water:Methanol (90:10) | 0.2 | — | NaOH (9.0) |
| 1002 | 103 | — | — | Water:Methanol (90:10) | 0.2 | — | NaOH (9.0) |
| 1003 | 96 | — | — | Water:Methanol (80:20) | 0.3 | — | KOH (9.5) |
| 1004 | 66 | — | — | Water:Methanol (80:20) | 0.3 | — | KOH (9.5) |
| 1005 | 67 | — | — | Water:Methanol (70:30) | 0.3 | — | KOH (10.0) |
| 1006 | 72 | — | — | Water:Methanol (70:30) | 0.3 | — | KOH (10.5) |
| 1007 | 73 | — | — | Water:Methanol (70:30) | 0.3 | — | KOH (11.0) |
| 1008 | 83 | Gelatin | a | Water:Methanol (90;10) | 0.3 | 100:50:200 | NaOH (9.0) |
| 1009 | 103 | Polyvinyl alcohol | a | Water:Methanol (90:10) | 0.3 | 100:50:100 | NaOH (9.0) |
| 1010 | 96 | Polyvinyl pyrrolidone | c | Water:Methanol (80:20 | 0.3 | 100:100:300 | KOH (9.5) |
| 1011 | 70 | Pectin | c | Water:Methanol (70:30) | 0.3 | 100:100:100 | KOH (9.5) |
| 1012 | 80 | Carboxymethyl cellulose | b | Water:Methanol (70:30) | 0.3 | 100:100:100 | KOH (10.0) |
| 1013 | 81 | Gelatin | b | Water:Methanol (70:30) | 0.3 | 100:200:100 | KOH (10.5) |
| 1014 | 75 | Polyacrylate | b | Water:Methanol (70:30) | 0.3 | 100:50:300 | KOH (11.0) |

TABLE 41

| | | | | | | | |
|---|---|---|---|---|---|---|---|
| | | | Polymer scale preventive agent | | | | |
| Exp. No. | (F) Condensation Product No. | (D) Water-Soluble polymeric compound | (E) Colloidal silica and/or alkali metal silicate | Solvent (weight ratio) | Total concentratoin of (F) + (D) + (E) (wt. %) | (F):(D):(E): (weight ratio) | Alkaline compound (pH) |
| 1015 | 45 | Gelatin | a | Water:Methanol (90:10) | 0.3 | 100:100:200 | NaOH (10.0) |
| 1016 | 46 | Hydroxyethyl cellulose | c | Water:Methanol (90:10) | 0.3 | 100:200:500 | NaOH (10.0) |
| 1017 | 47 | Polyvinyl pyrrolidone | b | Water:Methanol (80:20) | 0.3 | 100:50:100 | KOH (10.0) |
| 1018 | 48 | Casein | f | Water:Methanol (80:20) | 0.3 | 100:100:200 | Ethylenediamine (10.0) |
| 1019 | 49 | Pectin | g | Water:Methanol (80:20) | 0.3 | 100:100:200 | NaOH (9.0) |
| 1020 | 50 | Polyacrylate | d | Water:Methanol (90:10) | 0.5 | 100:30:200 | NaOH (9.5) |
| 1021 | 60 | Polyvinyl alcohol | Sodium orthosilicate | Water:Methanol (90:10) | 0.5 | 100: 10:200 | NaOH (11.0) |
| 1022 | 64 | Carboxymethyl cellulose | Sodium metasilicate | Water:Methanol (90:10) | 0.3 | 100:50:300 | KOH (11.0) |
| 1023 | 65 | Gelatin | c | Water:Methanol (80:20) | 0.3 | 100:100:100 | KOH (12.0) |
| 1024 | 55 | Gelatin | e | Water:Methanol (80:20) | 0.3 | 100:20:50 | NaOH (12.0) |
| 1025 | 58 | Gelatin | c | Water:Methanol (80:20) | 0.3 | 100:50:200 | NaOH (12.5) |
| 1026 | 84 | Polyvinyl pyrrolidone | d | Water:Methanol (80:20) | 0.3 | 100:50:200 | NaOH (9.5) |
| 1027 | 86 | Polyethylene imine | b | Water:Methanol (80:20) | 0.3 | 100:100:100 | NaOH (9.5) |

TABLE 42

| | | | | | | | |
|---|---|---|---|---|---|---|---|
| Exp. No. | (F) Condensation Product No. | (D) Water-Soluble polymeric compound | (E) Colloidal silica and/or alkali metal silicate | Solvent (weight ratio) | Total concentration of (F) + (D) + (E) (wt. %) | (F):(D):(E): (weight ratio) | Alkaline compound (pH) |
| 1028 | 87 | Polyacrylate | b | Water:Methanol (70:30) | 0.3 | 100:100:300 | KOH (9.5) |
| 1029 | 88 | Casein | c | Water:Methanol (70:30) | 0.3 | 100:50:100 | Ethylenediamine (9.5) |
| 1030 | 89 | Gelatin | c | Water:Methanol (90:10) | 0.3 | 100:30:200 | NaOH (9.5) |
| 1031 | 103 | Gelatin | a | Water:Methanol (90:10) | 0.5 | 100:200:100 | NaOH (10.5) |
| 1032 | 104 | Gelatin | b | Water:Methanol (90:10) | 0.5 | 100:100:100 | NaOH (10.0) |
| 1033 | 105 | Polyvinyl alcohol | b | Water:Methanol (90:10) | 0.5 | 100:40:100 | Triethanolamine (11.0) |
| 1034 | 96 | Polyacrylate | b | Water:Methanol (70:30) | 0.5 | 100:10:100 | NaOH (11.0) |
| 1035 | 97 | Polyvinyl alcohol | b | Water:Methanol (90:10) | 0.5 | 100:50:100 | NaOH (11.0) |
| 1036 | 66 | Gelatin | a | Water:Methanol (95:5) | 0.5 | 100:50:300 | NaOH (11.0) |
| 1037 | 67 | Gelatin | c | Water:Methanol (95:5) | 0.5 | 100:100:200 | NaOH (9.5) |
| 1038 | 80 | Gelatin | f | Water:Methanol (90:10) | 0.5 | 100:100:200 | NaOH (9.5) |
| 1039 | 93 | Pcetin | g | Water:Methanol (90:10) | 0.5 | 100:10:200 | NaOH (9.5) |
| 1040 | 95 | Hydroxyethyl cellulose | a | Water:Methanol (90:10) | 0.5 | 100:100:100 | NaOH (9.5) |

TABLE 43

Results after 150th polymerization batch

| Exp. No. | Liquid phase | Around interface of gas-liquid phases | Number of fish eyes | L value |
|---|---|---|---|---|
| 1001 | 2 | 120 | 17 | 72.5 |
| 1002 | 4 | 124 | 18 | 72.5 |
| 1003 | 5 | 133 | 18 | 72.4 |
| 1004 | 4 | 128 | 17 | 72.4 |
| 1005 | 3 | 135 | 19 | 72.5 |
| 1006 | 5 | 142 | 19 | 72.4 |
| 1007 | 4 | 126 | 17 | 72.5 |
| 1008 | 0 | 12 | 6 | 72.6 |
| 1009 | 0 | 10 | 6 | 72.6 |
| 1010 | 0 | 18 | 7 | 72.6 |
| 0111 | 0 | 11 | 6 | 72.6 |
| 1012 | 0 | 14 | 7 | 72.6 |
| 1013 | 0 | 13 | 6 | 72.6 |
| 1014 | 0 | 16 | 7 | 72.6 |

Scale amount (g/m²)

TABLE 44

Results after 150th polymerization batch

Scale amount (g/m²)

| Exp. No. | Liquid phase | Around interface of gas-liquid phases | Number of fish eyes | L value |
|---|---|---|---|---|
| 1015 | 0 | 80 | 13 | 72.4 |
| 1016 | 0 | 84 | 14 | 72.3 |
| 1017 | 0 | 91 | 15 | 72.4 |
| 1018 | 0 | 97 | 16 | 72.4 |
| 1019 | 0 | 83 | 14 | 72.3 |
| 1020 | 0 | 80 | 13 | 72.3 |
| 1021 | 0 | 80 | 13 | 72.4 |
| 1022 | 0 | 85 | 14 | 72.4 |
| 1023 | 0 | 98 | 17 | 72.4 |
| 1024 | 0 | 92 | 15 | 72.4 |
| 1025 | 0 | 95 | 16 | 72.4 |
| 1026 | 0 | 10 | 6 | 72.6 |
| 1027 | 0 | 13 | 7 | 72.5 |

TABLE 45

Results after 150th polymerization batch

Scale amount (g/m²)

| Exp. No. | Liquid phase | Around interface of gas-liquid phases | Number of fish eyes | L value |
|---|---|---|---|---|
| 1028 | 0 | 10 | 6 | 72.6 |
| 1029 | 0 | 13 | 7 | 72.5 |
| 1030 | 0 | 11 | 6 | 72.5 |
| 1031 | 0 | 14 | 7 | 72.5 |
| 1032 | 0 | 14 | 7 | 72.5 |
| 1033 | 0 | 9 | 6 | 72.6 |
| 1034 | 0 | 8 | 5 | 72.6 |
| 1035 | 0 | 12 | 6 | 72.6 |
| 1036 | 0 | 15 | 7 | 72.5 |
| 1037 | 0 | 10 | 6 | 72.6 |
| 1038 | 0 | 9 | 6 | 72.6 |
| 1039 | 0 | 31 | 8 | 72.5 |
| 1040 | 0 | 35 | 9 | 72.6 |

Example 11 (Experiment Nos. 1101 to 1121)

In each experiment, polymerization was conducted using a stainless steel polymerization vessel with an inner capacity of 20 liters and having a stirrer, as described below.

First, a polymer scale preventive agent was prepared using a condensation product (F), a water-soluble polymeric compound (D), a colloidal silica and/or an alkali metal silicate (E), a solvent and an alkaline compound given in Tables 46 and 47 under conditions given in Tables 46 and 47 (solvent composition, total concentration, (F):(D):(E) ratio and pH). The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

In the polymerization vessel in which the coating was formed as above, polymerization was carried out in the same manner as in Example 2. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 50 times. After the 50th batch, the amount of polymer scale on an area located in the liquid phase during polymerization and on an area in the vicinity of the interface between the gas and liquid phases, was measured in the same manner as in Example 1.

Further, to evaluate initial coloration at the time a polymer is formed into sheet, luminosity index L was measured in the same manner as in Example 2.

The results are given in Table 48 and 49.

TABLE 48

Results after 50th polymerization batch

| Exp. No. | Scale amount (g/m²) | | L value |
|---|---|---|---|
| | Liquid phase | Around interface of gas-liquid phases | |
| 1101 | 26 | 270 | 83.5 |
| 1102 | 25 | 250 | 83.6 |
| 1103 | 20 | 195 | 83.6 |
| 1104 | 28 | 290 | 83.4 |
| 1105 | 21 | 215 | 83.2 |
| 1106 | 0 | 23 | 85.5 |
| 1107 | 0 | 26 | 85.4 |
| 1108 | 2 | 38 | 85.4 |

TABLE 46

Polymer scale preventive agent

| Exp. No. | (F) Condensation Product No. | (D) Water-soluble polymeric compound | (E) Colloidal silica and/or alkali metal silicate | Solvent (weight ratio) | Total concentration of (F) + (D) + (E) (wt. %) | (F):(D):(E) (weight ratio) | Alkaline compound (pH) |
|---|---|---|---|---|---|---|---|
| 1101 | 45 | — | — | Water:Methanol (90:10) | 0.3 | — | NaOH (9.0) |
| 1102 | 50 | — | — | Water:Methanol (90:10) | 0.3 | — | NaOH (9.5) |
| 1103 | 53 | — | — | Water:Methanol (90:10) | 0.3 | — | NaOH (9.5) |
| 1104 | 64 | — | — | Water:Methanol (90:10) | 0.3 | — | NaOH (10.0) |
| 1105 | 56 | — | — | Water:Methanol (90:10) | 0.3 | — | NaOH (10.0) |
| 1106 | 18 | Gelatin | a | Water:Methanol (80:20) | 0.3 | 100:100:200 | NaOH (9.5) |
| 1107 | 19 | Pectin | b | Water:Methanol (95:5) | 0.3 | 100:30:100 | NaOH (9.5) |
| 1108 | 24 | Polyvinyl pyrrolidone | a | Water:Methanol (90:10) | 0.3 | 100:200:100 | KOH (10.0) |
| 1109 | 25 | Gelatin | c | Water:Methanol (80:20) | 0.3 | 100:50:200 | KOH (10.0) |
| 1110 | 29 | Polyvinyl alcohol | c | Water:Methanol (90:10) | 0.3 | 100:50:100 | Ethylenediamine (10.5) |
| 1111 | 32 | Polyacrylate | a | Water:Methanol (90:10) | 0.3 | 100:50:50 | Ethylenediamine (10.5) |

TABLE 47

Polymer scale preventive agent

| Exp. No. | (F) Condensation Product No. | (D) Water-soluble polymeric compound | (E) Colloidal silica and/or alkali metal silicate | Solvent (weight ratio) | Total concentration of (F) + (D) + (E) (wt. %) | (F):(D):(E) (weight ratio) | Alkaline compound (pH) |
|---|---|---|---|---|---|---|---|
| 1112 | 45 | Gelatin | a | Water:Methanol (90:10) | 0.3 | 100:50:200 | NaOH (10.0) |
| 1113 | 50 | Polyvinyl alcohol | c | Water:Methanol (90:10) | 0.5 | 100:50:100 | NaOH (10.0) |
| 1114 | 53 | Polyvinyl pyrrolidone | c | Water:Methanol (80:20) | 0.5 | 100:100:100 | Ethylenediamine (11.0) |
| 1115 | 64 | Gelatin | b | Water:Methanol (80:20) | 0.3 | 100:50:100 | KOH (11.0) |
| 1116 | 56 | Casein | b | Water:Methanol (70:30) | 0.3 | 100:20:50 | KOH (9.5) |
| 1117 | 55 | Pectin | b | Water:Methanol (95:5) | 0.3 | 100:50:100 | NaOH (9.5) |
| 1118 | 57 | Polyacrylate | b | Water:Methanol (95:5) | 0.3 | 100:50:200 | NaOH (9.5) |
| 1119 | 58 | Gelatin | a | Water:Methanol (90:10) | 0.3 | 100:30:300 | NaOH (9.5) |
| 1120 | 39 | Gelatin | a | Water:Methanol (90:10) | 0.3 | 100:50:200 | NaOH (10.0) |
| 1121 | 40 | Gelatin | a | Water:Methanol (90:10) | 0.3 | 100:50:200 | NaOH (10.0) |

TABLE 48-continued

Results after 50th polymerization batch

Scale amount (g/m²)

| Exp. No. | Liquid phase | Around interface of gas-liquid phases | L value |
|---|---|---|---|
| 1109 | 1 | 35 | 85.5 |
| 1110 | 0 | 25 | 85.5 |
| 1111 | 0 | 28 | 85.4 |

TABLE 49

Results after 50th polymerization batch

Scale amount (g/m²)

| Exp. No. | Liquid phase | Around interface of gas-liquid phases | L value |
|---|---|---|---|
| 1112 | 0 | 5 | 85.6 |
| 1113 | 0 | 5 | 85.6 |
| 1114 | 0 | 6 | 85.6 |
| 1115 | 0 | 5 | 85.6 |
| 1116 | 0 | 7 | 85.2 |
| 1117 | 0 | 5 | 85.2 |
| 1118 | 0 | 6 | 85.1 |
| 1119 | 0 | 5 | 85.1 |
| 1120 | 0 | 23 | 85.4 |
| 1121 | 2 | 38 | 85.5 |

Example 12 (Experiment Nos. 1201 to 1242)

First, a polymer scale preventive agent was prepared using a condensation product (F), a water-soluble polymeric compound (D), a colloidal silica and/or an alkali metal silicate (E), a solvent and an alkaline compound given in Tables 50–52 under conditions given in Tables 50–52 (solvent composition, total concentration, (F):(D):(E) ratio and pH). The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

In the polymerization vessel in which the coating was formed as above, polymerization was carried out in the same manner as in Example 2. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, the amount of polymer scale on an area located in the liquid phase during polymerization and on an area in the vicinity of the interface between the gas and liquid phases, was measured in the same manner as in Example 1.

Further, to evaluate initial coloration at the time a polymer is formed into sheet, luminosity index L was measured in the same manner as in Example 2.

The results are given in Table 53–55.

TABLE 50

| | | | | Polymer scale preventive agent | | | |
|---|---|---|---|---|---|---|---|
| Exp. No. | (F) Condensation Product No. | (D) Water-soluble polymeric compound | (E) Colloidal silica and/or alkali metal silicate | Solvent (weight ratio) | Total concentratoin of (F) + (D) + (E) (wt. %) | (F):(D):(E) (weight ratio) | Alkaline compound (pH) |
| 1201 | 83 | — | — | Water:Methanol (90:10) | 0.3 | — | NaOH (9.5) |
| 1202 | 106 | — | — | Water:Methanol (90:10) | 0.3 | — | Ethylenediamine (9.5) |
| 1203 | 107 | — | — | Water:Methanol (80:20) | 0.3 | — | NaOH (9.5) |
| 1204 | 68 | — | — | Water:Methanol (80:20) | 0.3 | — | NaOH (10.0) |
| 1205 | 76 | — | — | Water:Methanol (80:20) | 0.3 | — | NaOH (10.0) |
| 1206 | 77 | — | — | Water:Methanol (80:20) | 0.3 | — | NaOH (10.0) |
| 1207 | 83 | Gelatin | a | Water:Methanol (90:10) | 0.3 | 100:50:100 | NaOH (9.5) |
| 1208 | 85 | Polyacrylate | c | Water:Methanol (90:10) | 0.3 | 100:30:200 | KOH (9.5) |
| 1209 | 90 | Polyvinyl alcohol | c | Water:Methanol (80:20) | 0.3 | 100:50:100 | NaOH (10.0) |
| 1210 | 91 | Casein | b | Water:Methanol (80:20) | 0.3 | 100:100:300 | NaOH (10.0) |
| 1211 | 106 | Pectin | b | Water:Methanol (80:20) | 0.3 | 100:100:100 | NaOH (10.0) |
| 1212 | 107 | Gelatin | a | Water:Methanol (80:20) | 0.3 | 100:100:50 | NaOH (10.0) |
| 1213 | 50 | Polyacrylate | Litium trisilicate | Water:Methanol (90:10) | 0.3 | 100:50:200 | NaOH (10.0) |
| 1214 | 51 | Polyacrylamide | a | Water:Methanol (90:10) | 0.3 | 100:50:200 | NaOH (10.0) |

TABLE 51

| | | | | | | | |
|---|---|---|---|---|---|---|---|
| | | | | | Polymer scale preventive agent | | |
| Exp. No. | (F) Condensation Product No. | (D) Water-soluble polymeric compound | (E) Colloidal silica and/or alkali metal silicate | Solvent (weight ratio) | Total concentratoin of (F) + (D) + (E) (wt. %) | (F):(D):(E) (weight ratio) | Alkaline compound (pH) |
| 1215 | 52 | Hydroxyethyl cellulose | d | Water:Methanol (90:10) | 0.3 | 100:50:200 | NaOH (10.0) |
| 1216 | 53 | Pectin | Sodium metasilicate | Water:Methanol (90:10) | 0.3 | 100:50:200 | NaOH (10.0) |
| 1217 | 54 | Polyvinyl alcohol | c | Water:Methanol (80:20) | 0.3 | 100:100:300 | KOH (10.5) |
| 1218 | 61 | Gelatin | b | Water:Methanol (80:20) | 0.3 | 100:100:300 | KOH (10.5) |
| 1219 | 62 | Casein | e | Water:Methanol (80:20) | 0.3 | 100:100:300 | KOH (10.5) |
| 1220 | 55 | Pectin | c | Water:Methanol (80:20) | 0.3 | 100:100:300 | KOH (10.5) |
| 1221 | 57 | Carboxymethyl cellulose | c | Water:Methanol (80:20) | 0.3 | 100:50:200 | Ethylenediamine (9.5) |
| 1222 | 58 | Casein | c | Water:Methanol (80:20) | 0.3 | 100:50:100 | Triethanolamine (10.5) |
| 1223 | 59 | Gelatin | c | Water:Methanol (95:5) | 0.5 | 100:30:150 | NaOH (10.0) |
| 1224 | 58 | Polyacrylate | b | Water:Methanol (95:5) | 0.5 | 100:30:150 | NaOH (10.0) |
| 1225 | 58 | Polyvinyl pyrrolidone | f | Water:Methanol (95:5) | 0.5 | 100:30:150 | NaOH (10.0) |
| 1226 | 58 | Gelatin | o | Water:Methanol (95:5) | 0.5 | 100:30:150 | NaOH (10.0) |
| 1227 | 59 | Gelatin | b | Water:Methanol (95:5) | 0.5 | 100:30:150 | NaOH (10.0) |
| 1228 | 108 | Gelatin | a | Water:Methanol (90:10) | 0.3 | 100:50:100 | NaOH (10.5) |

TABLE 52

| | | | | | | | |
|---|---|---|---|---|---|---|---|
| | | | | | Polymer scale preventive agent | | |
| Exp. No. | (F) Condensation Product No. | (D) Water-soluble polymeric compound | (E) Colloidal silica and/or alkali metal silicate | Solvent (weight ratio) | Total concentratoin of (F) + (D) + (E) (wt. %) | (F):(D):(E) (weight ratio) | Alkaline compound (pH) |
| 1229 | 109 | Pectin | c | Water:Methanol (90:10) | 0.3 | 100:200:300 | NaOH (10.5) |
| 1230 | 110 | Polyacrylate | c | Water:Methanol (90:10) | 0.5 | 100:100:400 | NaOH (10.5) |
| 1231 | 111 | Polyacrylamide | c | Water:Methanol (90:10) | 0.5 | 100:20:100 | NaOH (10.5) |
| 1232 | 98 | Hydroxyethyl cellulose | a | Water:Methanol (90:10) | 0.5 | 100:100:300 | NaOH (10.5) |
| 1233 | 99 | Polyacrylate | b | Water:Methanol (80:20) | 0.3 | 100:100:50 | KOH (10.0) |
| 1234 | 100 | Polyvinyl pyrrolidone | b | Water:Methanol (80:20) | 0.3 | 100:50:100 | Ethylenediamine (9.5) |
| 1235 | 101 | Polyvinyl alcohol | c | Water:Methanol (80:20) | 0.3 | 100:50:100 | KOH (10.5) |
| 1236 | 102 | Polyvinyl alcohol | c | Water:Methanol (90:10) | 0.3 | 100:50:100 | NaOH (11.0) |
| 1237 | 67 | Polyvinyl alcohol | d | Water:Methanol (90:10) | 0.3 | 100:100:200 | NaOH (11.0) |
| 1238 | 69 | Gelatin | e | Water:Methanol (90:10) | 0.3 | 100:100:200 | NaOH (11.0) |
| 1239 | 92 | Gelatin | a | Water:Methanol (90:10) | 0.3 | 100:100:200 | NaOH (11.0) |
| 1240 | 94 | Gelatin | a | Water:Methanol (90:10) | 0.3 | 100:100:200 | NaOH (10.0) |
| 1241 | 74 | Gelatin | a | Water:Methanol (90:10) | 0.3 | 100:100:200 | NaOH (10.0) |
| 1242 | 82 | Gelatin | a | Water:Methanol (90:10) | 0.3 | 100:100:200 | NaOH (10.0) |

TABLE 53

Results after 80th polymerization batch

| Exp. No. | Scale amount (g/m²) Liquid phase | Scale amount (g/m²) Around interface of gas-liquid phases | L value |
|---|---|---|---|
| 1201 | 4 | 62 | 85.3 |
| 1202 | 5 | 68 | 85.3 |
| 1203 | 5 | 64 | 85.3 |
| 1204 | 7 | 78 | 85.2 |
| 1205 | 6 | 69 | 85.3 |
| 1206 | 4 | 57 | 85.3 |
| 1207 | 0 | 7 | 85.6 |
| 1208 | 0 | 5 | 85.5 |

TABLE 53-continued

Results after 80th polymerization batch

| Exp. No. | Scale amount (g/m$^2$) | | L value |
|---|---|---|---|
| | Liquid phase | Around interface of gas-liquid phases | |
| 1209 | 0 | 6 | 85.6 |
| 1210 | 0 | 5 | 85.6 |
| 1211 | 0 | 8 | 85.5 |
| 1212 | 0 | 5 | 85.6 |
| 1213 | 7 | 103 | 85.4 |
| 1214 | 9 | 114 | 85.3 |

TABLE 54

Results after 80th polymerization batch

| Exp. No. | Scale amount (g/m$^2$) | | L value |
|---|---|---|---|
| | Liquid phase | Around interface of gas-liquid phases | |
| 1215 | 8 | 110 | 85.3 |
| 1216 | 10 | 125 | 85.2 |
| 1217 | 6 | 98 | 85.4 |
| 1218 | 8 | 109 | 85.3 |
| 1219 | 5 | 91 | 85.3 |
| 1220 | 10 | 120 | 85.3 |
| 1221 | 5 | 95 | 85.4 |
| 1222 | 8 | 107 | 85.3 |
| 1223 | 6 | 102 | 85.4 |
| 1224 | 10 | 124 | 85.2 |
| 1225 | 8 | 112 | 85.3 |
| 1226 | 6 | 97 | 85.3 |
| 1227 | 9 | 121 | 85.3 |
| 1228 | 0 | 5 | 85.5 |

TABLE 55

Results after 80th polymerization batch

| Exp. No. | Scale amount (g/m$^2$) | | L value |
|---|---|---|---|
| | Liquid phase | Around interface of gas-liquid phases | |
| 1229 | 0 | 6 | 85.6 |
| 1230 | 0 | 6 | 85.5 |
| 1231 | 0 | 6 | 85.5 |
| 1232 | 0 | 5 | 85.5 |
| 1233 | 0 | 5 | 85.6 |
| 1234 | 0 | 7 | 85.5 |
| 1235 | 0 | 5 | 85.6 |
| 1236 | 0 | 6 | 85.5 |
| 1237 | 0 | 5 | 85.6 |
| 1238 | 0 | 5 | 85.6 |
| 1239 | 0 | 45 | 85.2 |
| 1240 | 1 | 48 | 85.1 |
| 1241 | 0 | 5 | 85.6 |
| 1242 | 0 | 5 | 85.6 |

Example 13

Polymerization was conducted using a stainless steel polymerization vessel with an inner capacity of 1,000 liters and having a stirrer, as described below.

The polymer scale preventive agent used in Experiment No. 1213 was applied to the inner wall, the stirring shaft, the stirring blades and other areas with which a monomer comes into contact of the polymerization vessel. The applied polymer scale preventive agent was dried by heating at 50° C. for 10 minutes to form a coating, which was then washed with water.

Thereafter, in the polymerization vessel in which the coating was formed as above, 400 kg of water, 260 kg of styrene, 140 kg of acrylonitrile, 400 g of a partially saponified product of a polyacrylamide and 1.2 kg of α,α'-azobisisobutyronitrile were charged, and polymerization was carried out at 90° C. for 5 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 50 times. After the 50th batch, amount of polymer scale was measured in the same manner as in Example 1. Specifically, the amount of polymer scale on an area located in the liquid during polymerization was measured to be 0 g/m$^2$, and the amount of polymer scale on an area in the vicinity of the interface between the gas and liquid phases was measured to be 12 g/m$^2$.

Example 14

Polymerization was conducted using a stainless steel polymerization vessel with an inner capacity of 20 liters and having a stirrer, as described below.

The polymer scale preventive agent used in Experiment No. 1207 was applied to the inner wall, the stirring shaft, the stirring blades and other areas with which a monomer comes into contact of the polymerization vessel. The applied polymer scale preventive agent was dried by heating at 50° C. for 10 minutes to form a coating, which was then washed with water.

Thereafter, into the polymerization vessel in which the coating was formed as above, 9.5 kg of water, 240 g of sodium dodecylbenzenesulfonate, 15 g of t-dodecyl mercaptan, 2.1 kg of butadiene, 2.8 g of methyl methacrylate, 320 g of styrene and 16 g of potassium persulfate were charged. Polymerization was then carried out at 60° C. for 10 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, amount of polymer scale was measured in the same manner as in Example 1. Specifically, the amount of polymer scale on an area located in the liquid during polymerization was measured to be 0 g/m$^2$, and the amount of polymer scale on an area in the vicinity of the interface between the gas and liquid phases was measured to be 9 g/m$^2$.

Example 15

Polymerization was conducted using a stainless steel polymerization vessel with an inner capacity of 100 liters and having a stirrer, as described below.

The polymer scale preventive agent used in Experiment No. 1233 was applied to the inner wall, the stirring shaft, the stirring blades and other areas with which a monomer comes into contact of the polymerization vessel. The applied polymer scale preventive agent was dried by heating at 50° C. for 15 minutes to form a coating, which was then washed with water.

Thereafter, in the polymerization vessel in which the coating was formed as above, 40 kg of water, 500 g of a disproportionated potassium rhodinate, 13 kg of a polybutadiene latex (solid content: 45%), 9 kg of styrene monomer, 5 kg of acrylonitrile monomer, 40 g of t-dodecyl mercaptan, and 140 g of cumene hydroperoxide were charged. Thereafter, when the internal temperature became 47° C., 200 g of dextrose, 2 g of ferrous sulfate and 100 g of sodium pyrophosphate were charged in the vessel, followed by polymerization under stirring at 65° C. for 4 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, amount of polymer scale was measured in the same manner as in Example 1. Specifically, the amount of polymer scale on an area located in the liquid during polymerization was measured to be 0 g/m$^2$, and the amount of polymer scale on an area in the vicinity of the interface between the gas and liquid phases was measured to be 8 g/m$^2$.

Example 16

Polymerization was conducted using a stainless steel polymerization vessel with an inner capacity of 20 liters and having a stirrer, as described below.

The polymer scale preventive agent used in Experiment No. 1218 was applied to the inner wall, the stirring shaft, the stirring blades and other areas with which a monomer comes into contact of the polymerization vessel. The applied polymer scale preventive agent was dried by heating at 50° C. for 15 minutes to form a coating, which was then washed with water.

Thereafter, in the polymerization vessel in which the coating was formed as above, 4.0 kg of water and 6 g of sodium dodecylbenzenesulfonate were added, and they were heated to 60° C. under stirring. The air inside the polymerization vessel was replaced with a nitrogen gas, and thereafter 94 g of n-butyl acrylate, 220 g of methyl methacrylate, 5 g of acrylic acid and 5 g of methacrylic acid were added thereto. Subsequently, after 1 g of ammonium persulfate and 1 g of sodium hydrosulfite were added, stirring was continued at 60° C. for 20 minutes. Subsequently, a monomeric mixture containing 2.1 kg of n-butyl acrylate, 4.8 kg of methyl methacrylate, 100 g of acrylic acid and 100 g of methacrylic acid, 500 g of 1% by weight aqueous ammonium persulfate solution, 500 g of 1% by weight aqueous sodium hydrosulfite solution and 2.0 kg of 25% by weight polyoxyethylene nonylphenyl ether solution were added uniformly to the reaction mixture over 3 hours. After the addition, the reaction mixture was heated to 70° C. and polymerization was carried out for 2 hours. After the completion of the polymerization, the produced polymer was taken out and the unreacted monomer was recovered out of the polymerization vessel. Subsequently, the inside of the polymerization vessel was washed with water and residual resin was removed.

The batch above comprising the operations from forming a coating through polymerizing to washing with water was repeated 50 times. After the 50th batch, amount of polymer scale was measured in the same manner as in Example 1. Specifically, the amount of polymer scale on an area located in the liquid during polymerization was measured to be 0 g/m$^2$, and the amount of polymer scale on an area in the vicinity of the interface between the gas and liquid phases was measured to be 13 g/m$^2$.

Example 17

Polymerization was conducted using a stainless steel polymerization vessel with an inner capacity of 20 liters and having a stirrer, as described below.

The polymer scale preventive agent used in Experiment No. 1236 was applied to the inner wall, the stirring shaft, the stirring blades and other areas with which a monomer comes into contact of the polymerization vessel. The applied polymer scale preventive agent was dried by heating at 60° C. for 10 minutes to form a coating, which was then washed with water.

Thereafter, in the polymerization vessel in which the coating was formed as above, 4.5 kg of water, 312 g of a completely saponified polyvinyl alcohol, and 6 g of sodium carbonate were charged. Subsequently, the mixture was heated to 65° C. under stirring. After 550 g of vinyl acetate and 550 g of 1% by weight aqueous ammonium persulfate solution were added thereto, the mixture was heated to 80° C. Subsequently, 5.0 kg of vinyl acetate and 1.0 kg of 1% by weight aqueous ammonium persulfate solution were added thereto uniformly over 4 hours. After the addition of the vinyl acetate and ammonium persulfate, the reaction mixture was heated to 90° C. and polymerization was carried out at 90° C. for 2 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, amount of polymer scale was measured in the same manner as in Example 1. Specifically, the amount of polymer scale on an area located in the liquid during polymerization was measured to be 0 g/m$^2$, and the amount of polymer scale on an area in the vicinity of the interface between the gas and liquid phases was measured to be 5 g/m$^2$.

Example 18

Polymerization was conducted using a stainless steel polymerization vessel with an inner capacity of 20 liters and having a stirrer, as described below.

The polymer scale preventive agent used in Experiment No. 1209 was applied to the inner wall, the stirring shaft, the stirring blades and other areas with which a monomer comes into contact of the polymerization vessel. The applied polymer scale preventive agent was dried by heating at 50° C. for 20 minutes to form a coating, which was then washed with water.

Thereafter, in the polymerization vessel in which the coating was formed as above, 7.0 kg of water, 430 g of a partially saponified polyvinyl alcohol, 7 g of sodium pyrophosphate and 7 g of sodium hydrosulfite were added, and they were heated to 50° C. After the air inside the polymerization vessel was replaced with a nitrogen gas, the reaction mixture was heated to 70° C. Thereafter, ethylene was charged into the vessel until the internal pressure became 14 kg/cm$^2$.G. Subsequently, 6.0 kg of vinyl acetate and 1.0 kg of 2% by weight aqueous ammonium persulfate solution were added uniformly over 4 hours. After the addition of the vinyl acetate and ammonium persulfate, the reaction mixture was heated to 80° C., at which polymerization was carried out for 3 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, amount of polymer scale was measured in the same manner as in Example 1. Specifically, the amount of polymer scale on an area located in the liquid during polymerization was measured to be 0 g/m$^2$, and the amount of polymer scale on an area in the vicinity of the interface between the gas and liquid phases was measured to be 7 g/m$^2$.

Example 19

Polymerization was conducted using a stainless steel polymerization vessel with an inner capacity of 20 liters and having a stirrer, as described below.

The polymer scale preventive agent used in Experiment No. 1021 was applied to the inner wall, the stirring shaft, the stirring blades and other areas with which a monomer comes into contact of the polymerization vessel. The applied polymer scale preventive agent was dried by heating at 60° C. for 20 minutes to form a coating, which was then washed with water.

Thereafter, in the polymerization vessel in which the coating was formed as above, an aqueous solution containing 1.2 kg of a polyvinyl alcohol with a saponification degree of 99.4 mole % and a polymerization degree of 2,250 in 15 liters of water was charged. To the aqueous solution under stirring, 1 kg of 35% concentrated hydrochloric acid was added. Ten minutes after the addition of the concentrated hydrochloric acid, 800 g of butyraldehyde was added dropwise thereto over 15 minutes. Thereafter, the reaction mixture was heated to 60° C., at which reaction was carried out for 3 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 100 times. After the 100th batch, amount of polymer scale was measured in the same manner as in Example 1. Specifically, the amount of polymer scale on an area located in the liquid during polymerization was measured to be 0 g/m$^2$, and the amount of polymer scale on an area in the vicinity of the interface between the gas and liquid phases was measured to be 8 g/m$^2$.

Example 20

1) Preparation of prepolymer

A prepolymer for use in this example was prepared as below.

A polymerization vessel was charged with 6,000 g of styrene monomer, 720 g of a polybutadiene rubber, 480 g of a mineral oil (tradename: CP-50, product of Idemitsu Kosan K.K.) and 6,000 g of n-dodecyl mercaptan, and they were allowed to react at 115° C. for 5 hours to produce a prepolymer.

2) Polymerization

Polymerization was conducted using a stainless steel polymerization vessel with an inner capacity of 20 liters and having a stirrer, as described below.

The polymer scale preventive agent used in Experiment No. 1020 was applied to the inner wall, the stirring shaft, the stirring blades and other areas with which a monomer comes into contact of the polymerization vessel. The applied polymer scale preventive agent was dried by heating at 60° C. for 10 minutes to form a coating, which was then washed with water.

Thereafter, in the polymerization vessel in which the coating was formed as above, 7,000 g of water, 7,000 g of the prepolymer prepared above, 70 g of hydroxyapatite, 0.14 g of sodium dodecylbenzenesulfonate, 17.5 g of benzoyl peroxide and 10.5 g of t-butyl perbenzoate were charged. Subsequently, reaction was carried out at 92° C. for 3.5 hours and then at 135° C. for 1 hour, to produce a polymer. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 100 times. After the 100th batch, amount of polymer scale was measured in the same manner as in Example 1. Specifically, the amount of polymer scale on an area located in the liquid during polymerization was measured to be 0 g/m$^2$, and the amount of polymer scale on an area in the vicinity of the interface between the gas and liquid phases was measured to be 22 g/m$^2$.

We claim:

1. A process of producing a polymer of an ethylenically unsaturated double bond, which comprises polymerizing the monomer in a polymerization vessel having a polymer scale preventive coating on its inner wall surfaces, wherein said coating has been formed by applying an alkaline solution containing a condensation product of (A) an aromatic amine compound and (B) a quinone compound, followed by drying.

2. The process of claim 1, wherein said polymerization is conducted as suspension polymerization, emulsion polymerization, solution polymerization, bulk polymerization or gas phase polymerization.

3. The process of claim 1, wherein said monomer is selected from the group consisting of vinyl esters; vinyl halides; vinylidene halides; acrylic acid, methacrylic acid and their esters and salts; diene monomers; styrene; acrylonitrile; α-methylstyrene; and vinyl ethers.

4. The process of claim 1, wherein the component (A) comprises at least one compound selected from the group consisting of (A-1) aromatic amine compounds having at least one group selected from the group consisting of hydroxyl group, carboxyl group and sulfo group, represented by the formulas (1), (2) and (3):

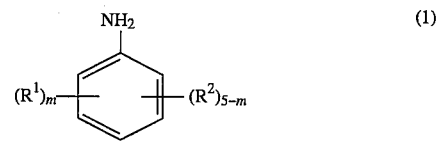

wherein m is an integer of 1 to 5, R$^1$ stands for at least one group selected from the group consisting of —OH, —COOH and —SO$_3$H and, where there exist two or more R$^1$'s, the R$^1$'s may be the same or different, and R$^2$ stands for at least one group selected from the group consisting of —H, —NH$_2$, —Cl, —NO$_2$, —COCH$_3$, —OCH$_3$, —N(CH$_3$)$_2$ and alkyl groups having 1 to 3 carbon atoms and, where there exist two or more R$^2$'s, the R$^2$'s may be the same or different;

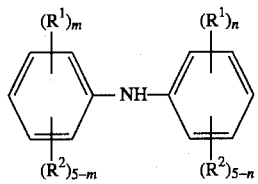
(2)

wherein m is as defined above, R$^1$ is as defined above and, where two or more R$^1$'s are present, they may be the same or different, R$^2$ is as defined above and, where two or more R$^2$'s are present, they may be the same or different, and n is an integer of 0 to 5; and

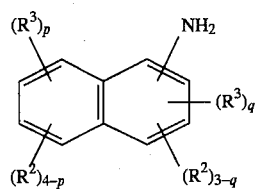
(3)

wherein p is an integer of 0 to 4, q is an integer of 0 to 3, provided that p and q are not 0 at the same time, R$^2$ is as defined above and, where two or more R$^2$'s are present, they may be the same or different, and R$^3$ is at least one group selected from the group consisting of —OH, —COOH, CH$_2$COOH, —CH$_2$CH$_2$COOH and —SO$_3$H and, where two or more R$^3$'s are present, they may be the same or different; and (A-2) aromatic amine compounds free of hydroxyl group, carboxyl group and sulfo group represented by the formulas (4), (5) and (6):

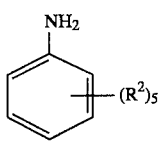
(4)

wherein R$^2$ may be the same and different and are each as defined above;

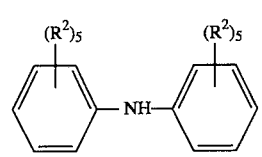
(5)

wherein R$^2$ may be the same or different and are each as defined above; and

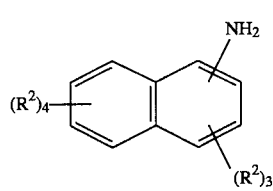
(6)

wherein R$^2$ may be the same or different and are each as defined above.

5. The process of claim 1, wherein the component (A) is an aromatic amine compound having at least one group selected from the group consisting of hydroxyl group, carboxyl group and sulfo group.

6. The process of claim 1, wherein the component (A) comprises at least one aromatic amine compound having at least one group selected from the group consisting of hydroxyl group, carboxyl group and sulfo group and at least one aromatic amine compound free of hydroxyl group, carboxyl group and sulfo group.

7. The process of claim 1, wherein the component (B) comprises at least one quinone compound selected from the group consisting of the compounds represented by the formulas (7), (8), (9) and (10):

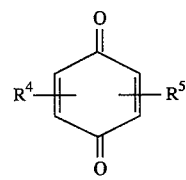
(7)

wherein R$^4$ stands for —H, —NH$_2$, —Cl, —Br, —OH, —NO$_2$, —COCH$_3$, —OCH$_3$, —N(CH$_3$)$_2$ or an alkyl group having 1 to 3 carbon atoms, and R$^5$ stands for —H, —NH$_2$, —CH$_3$, —OH, —COOH or —SO$_3$H;

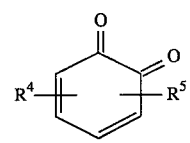
(8)

wherein R$^4$ and R$^5$ are as defined above;

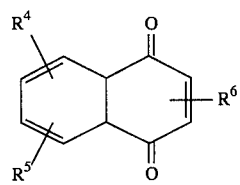
(9)

wherein R$^4$ and R$^5$ are as defined above, and R$^6$ stands for —H, —OH, —CH$_3$ —Cl, —Br, —COCH$_3$ —OCH$_3$ —COOH or —SO$_3$H; and

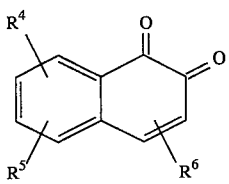
(10)

wherein R$^4$, R$^5$ and R$^6$ are as defined above.

8. The process of claim 1, wherein the condensation product has been produced by a process in which a condensation reaction of the components (A) and (B) is first initiated and thereafter a reaction stopper (C) is added to the reaction mixture for the condensation reaction.

9. The process of claim 8, wherein the reaction stopper (C) is an inorganic reducing agent.

10. The process of claim 8, wherein the reaction stopper (C) is an aromatic hydroxyl compound.

11. The process of claim 8, wherein the reaction stopper (C) is an aromatic hydroxyl compound-based condensate.

12. The process of claim 8, wherein the reaction stopper (C) is added to the reaction mixture at a time when reaction of the components (A) and (B) has reached a condensation conversion value in the range of 50 to 99% by weight.

13. The process of claim 1, wherein the condensation product of the components (A) and (B) is contained in a concentration of about 0.001 to about 5% by weight of said alkaline solution.

14. The process of claim 1, wherein said alkaline solution contains (E) at least one compound selected from the group consisting of colloidal silicas and alkali metal silicates.

* * * * *